(12) United States Patent
Michlin

(10) Patent No.: US 6,876,827 B1
(45) Date of Patent: *Apr. 5, 2005

(54) TONER CARTRIDGE, CONTACT DEVICE AND METHOD FOR DEVELOPER ROLLER AND TONER CARTRIDGE USED THEREIN

(76) Inventor: Steven Bruce Michlin, 6771 Cottonwood Knoll, West Bloomfield, MI (US) 48322

( * ) Notice: Subject to any disclaimer, the term of this patent is extended or adjusted under 35 U.S.C. 154(b) by 0 days.

This patent is subject to a terminal disclaimer.

(21) Appl. No.: 10/634,307

(22) Filed: Aug. 5, 2003

Related U.S. Application Data

(63) Continuation of application No. 09/996,453, filed on Jul. 10, 2000, now Pat. No. 6,606,467, which is a continuation-in-part of application No. 09/613,145, filed on Jul. 10, 2000, now Pat. No. 6,321,048, which is a continuation-in-part of application No. 09/109,309, filed on Jun. 30, 1998, now Pat. No. 6,131,261.

(51) Int. Cl.[7] .......................... G03G 15/06; G03G 21/00
(52) U.S. Cl. .......................... 399/90; 399/111; 399/279
(58) Field of Search .......................... 399/90, 111, 110, 399/119, 279; 439/11, 13, 27, 29; 174/59; 361/212, 214

(56) References Cited

U.S. PATENT DOCUMENTS 5,634,175 A * 5/1997 Michlin et al. ................ 399/90
5,819,146 A * 10/1998 Roderick .................... 399/276

* cited by examiner

Primary Examiner—Sophia S. Chen

(57) ABSTRACT

An image forming apparatus or toner cartridge component thereof uses a bias voltage contact device that fits into an electrobushing which transmits the electrical contact has been invented. Thus, now a bushing can also act as an electrical contact and thereby a spring is not a requirement. The cylindrical bias voltage contact fits into a developer roller and has a smaller portion that is also cylindrical and fits into an electrobushing. The electrobushing is contacted electrically to the power supply of the image forming apparatus. The cylindrical bias voltage contact may have a cylindrical portion that fits into the developer roller by press fit with the new feature where the cylindrical portion has more than one diameter for obtaining a better press fit.

47 Claims, 22 Drawing Sheets

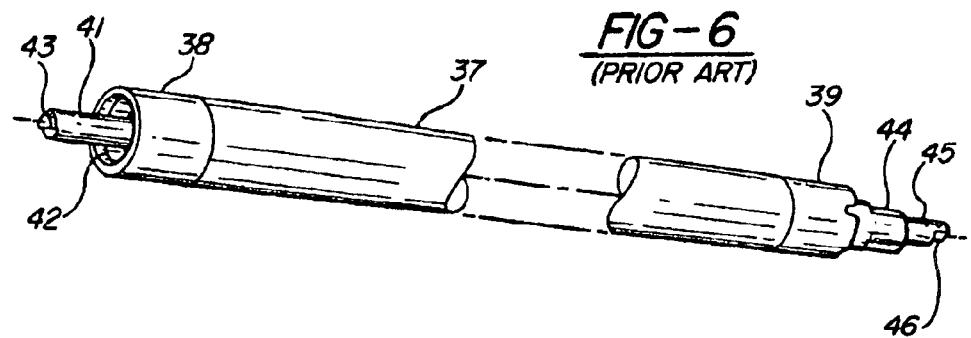
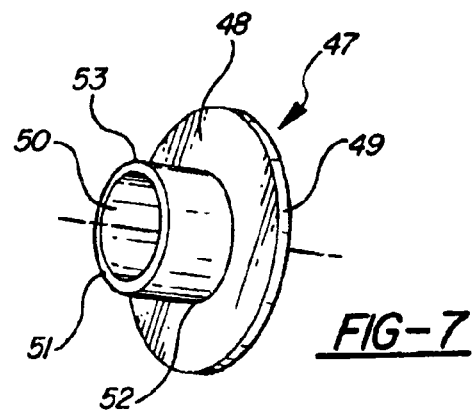
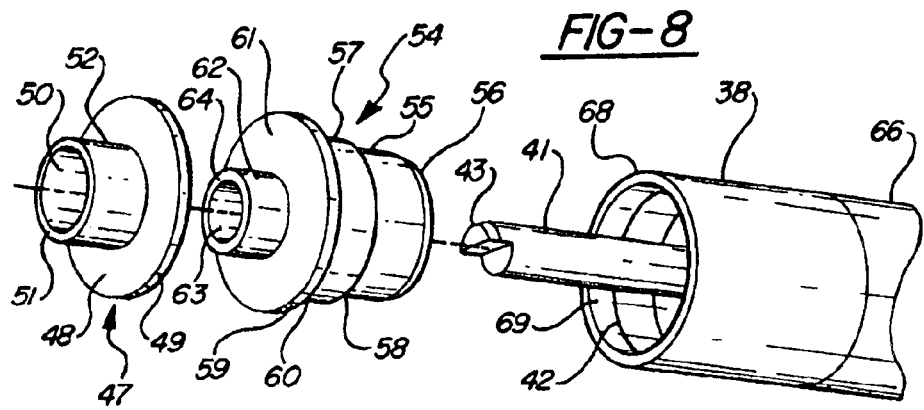

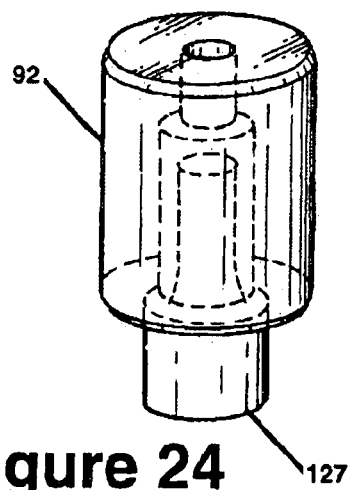
Figure 24
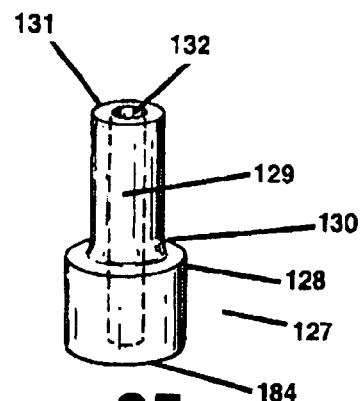
Figure 25
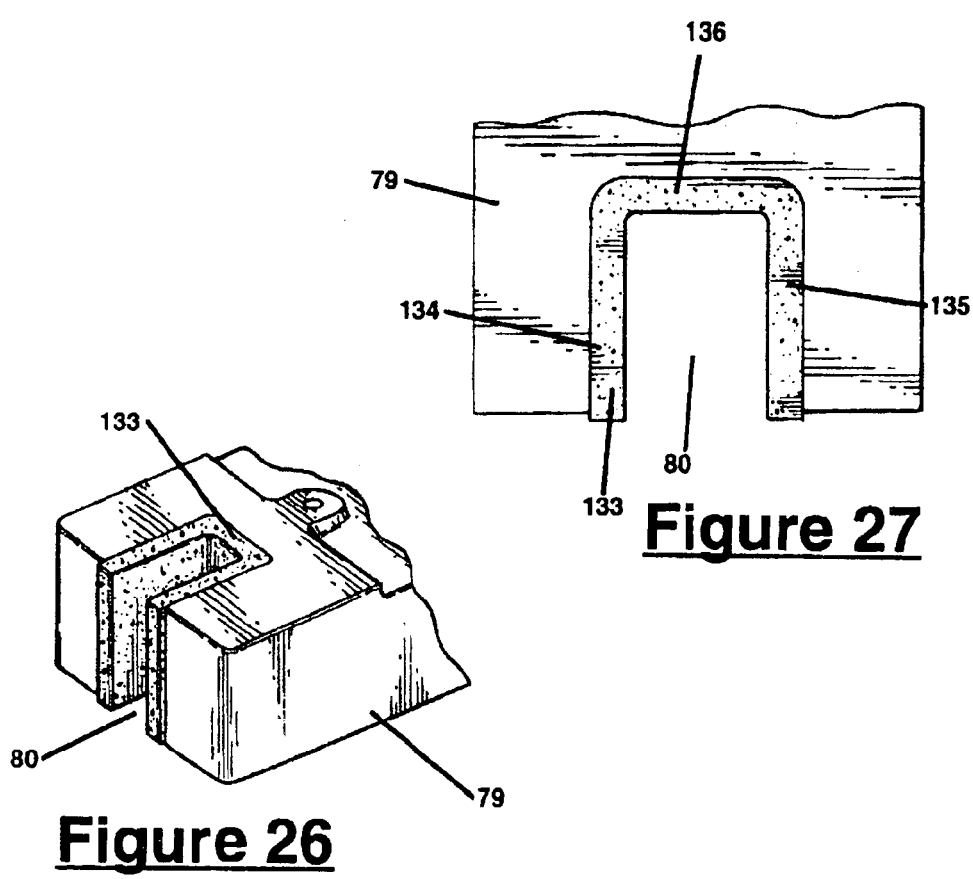
Figure 27
Figure 26

Figure 29
*(PRIOR ART)*
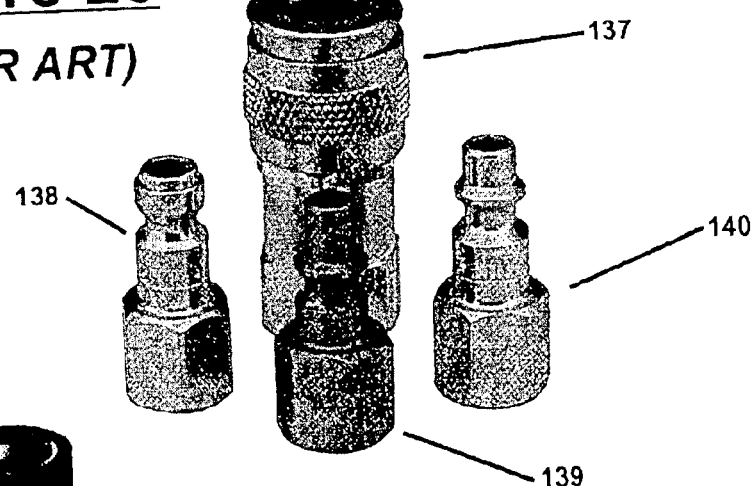
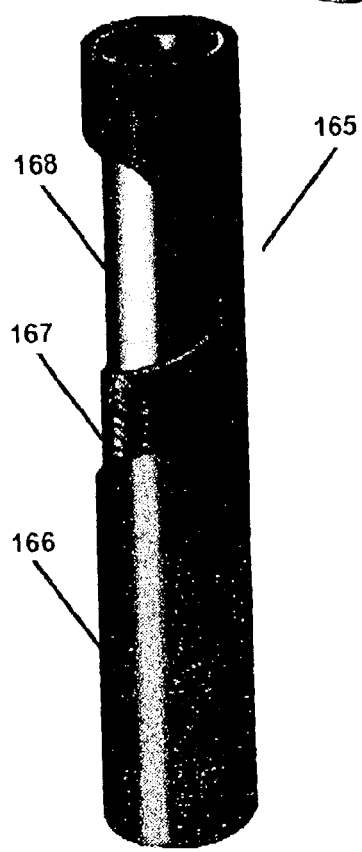
Figure 35
*(PRIOR ART)*
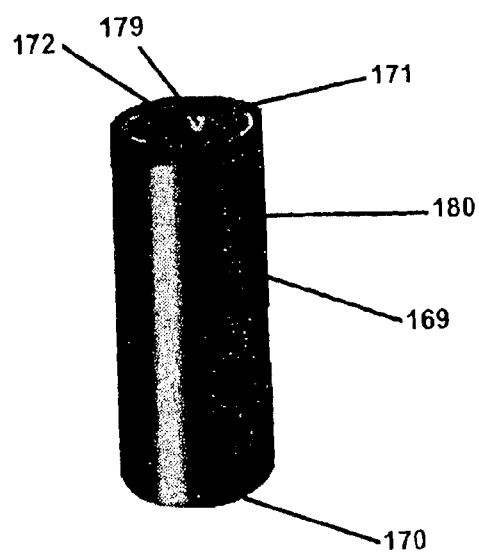
Figure 36

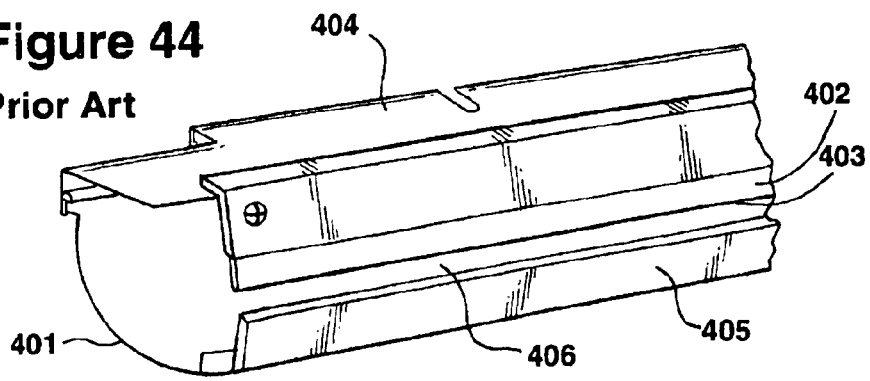
Figure 44
Prior Art
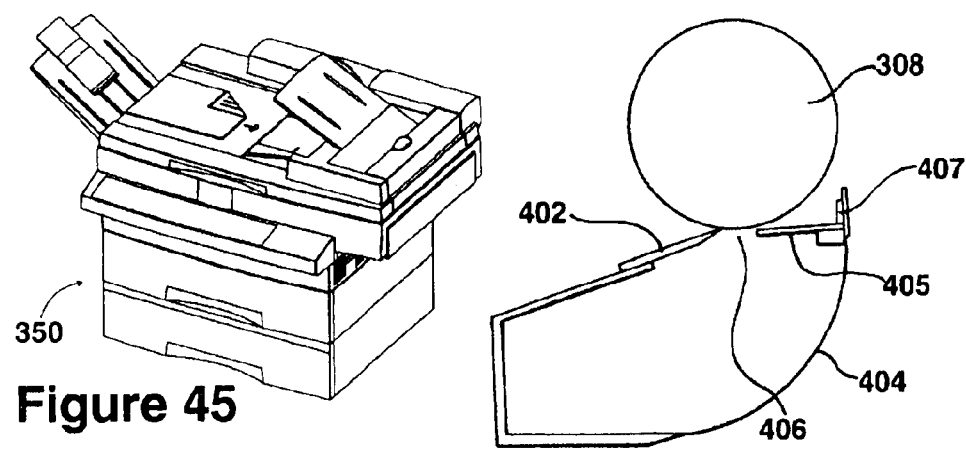
Figure 45
Prior Art
Figure 46
Prior Art
Figure 47
Prior Art
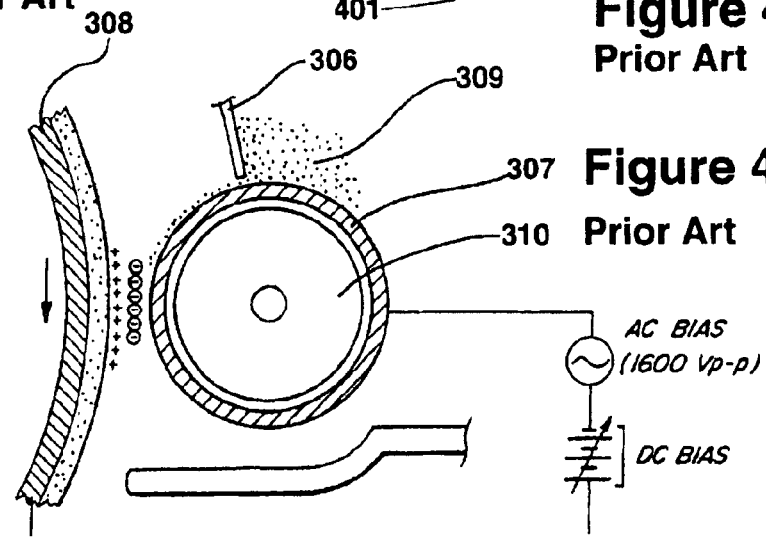

TONER CARTRIDGE, CONTACT DEVICE AND METHOD FOR DEVELOPER ROLLER AND TONER CARTRIDGE USED THEREIN

This Application is a Continuation of Ser. No. 09/996,453 filed on Jul. 10, 2000, now U.S. Pat. No. 6,606,467, which is a Continuation-In-Part of Ser. No. 09/613,145 filed on Jul. 10, 2000, now U.S. Pat. No. 6,321,048, which issued on Nov. 20, 2001, which is a Continuation-In-Part of Ser. No. 09/109,309 filed on Jun. 30, 1998, now U.S. Pat. No. 6,131,261, which issued on Oct. 17, 2000.

BACKGROUND OF THE INVENTION

In the parent Application, claims were obtained on the arbor press with extender, including methods. The second Application focused on the improved toner cartridge, contact device, image forming apparatus and methods also described in the Application. This Application will also focus on the improved toner cartridge, contact device, image forming apparatus and methods also described in the Application. The reason all devices and methods were entered in the same Application is because originally the Arbor Press, Extender and Methods were invented for the purpose of press-fitting the contact device of this invention. However, it was found that this Arbor Press, extender and methods were a pioneer patent in many industries without limit and inventor did not want to limit it to the imaging industry as it has utility in so many industries. This continuation-in-part, however, concerns the improved toner cartridge, image forming apparatus, contact device and methods thereof.

This invention relates to solving problems in Xerography and more specifically in the toner cartridge remanufacturing industry. This includes copiers, laser printers and facsimile machines which will be referred to as imaging machines. This invention also relates to the industrial machinery industry.

CANON has designed an all-in-one cartridge as seen in U.S. Pat. No. 4,975,744, issued Dec. 4, 1990 and assigned to CANON. Several companies have used these cartridges in laser printers, copy machines and facsimile machines, each with the varying printer engines and a different nameplate. Originally, these cartridges were designed to be "disposable". However, after the first all-in-one toner cartridge was introduced, it did not take long before laser cartridge remanufacturers such as myself began remanufacturing these cartridges. These "disposable" cartridges were designed to function for only one cartridge cycle without remanufacturing. The remanufacturers had found certain components that needed replacement on a regular basis. In 1990, the first aftermarket photoreceptor drum became available for use in remanufacturing the all-in-one cartridge of the "SX" engine variety, the most popular printer cartridge from around 1987 through 1993. When the long-life photoreceptor drum became available, the entire remanufacturing industry turned around and gained great strength and began a huge growth surge that still continues. In October 1993, HEWLETT-PACKARD, the largest seller of this printer engine using the all-in-one cartridge, entered the cartridge remanufacturing industry with the "Optiva" cartridge, further increasing the size as well as credibility of this relatively new industry. However, this relatively new industry grew from the all-in-one cartridge shortly after its debut. Before the introduction of the long-life drum, sometimes called the "superdrum" or "duradrum", the SX cartridge would last for around three cartridge remanufacturing cycles at best, since the actual useful life of the OEM drum was three cycles. However, the long-life drums got their names from the fact that they were designed to last for many remanufacturing cycles or recharges as they are sometimes called. Typically, the long life drum can last for ten or more such cycles, unlike the typical OEM (Original Equipment Manufacturer) drum. With the additional developments of drum coatings, originally designed for OEM drums, the long-life drum may last for many additional cycles. Some coatings, in theory, were designed to be dissolved and removed from over the drum surface every 1–3 cycles, so the drum life of the long-life drum almost seems limitless.

However, with photoreceptor drums lasting for many cycles, other components of the cartridge have a tendency to require greater durability, a better solution, or a greater life. Also, as the success of these cartridges has skyrocketed, the demand is for cartridges with longer cycles, so component improvements are significant. Therefore, avoiding natural problems with prevention means must also be implemented for cartridges of longer life both in longer cycle times and greater number of cycles. One good example is the electrical contact used in many developer rollers of toner cartridge assemblies.

Inventor was awarded U.S. Pat. Nos. 5,634,175 and 5,648,838 for electrical contacts for developer roller assemblies. To properly install an electrical contact from the above patents in, the most robust way, one would want to press-fit the contact into the inner wall of the developer roller. It sounds simple. However, you can not just get an arbor press and press fit the contacts because arbor presses have a very short maximum press-fit height. Most arbor presses look alike, just that some are bigger and more powerful than the others, among the most common arbor presses. However, a ½ ton arbor press has a 4 inch height and a one ton press is not much higher, a two ton press is not much higher and even a 5 ton arbor press typically is not very high. To press-fit contacts into developer rollers, most developer rollers are over ten inches long and even an expensive 5 ton arbor press, much greater in weight and power than necessary, is not long enough to press-fit all sizes of developer rollers. In another example, the WX (5Si) developer roller is over 18 inches long and would not even fit in a 5 ton arbor press in the typical case. To solve this problem, inventor has developed an arbor press extender device to lengthen the maximum press length that an arbor press may press. Thus, with this invention, even a small ½ ton arbor press may be used for press-fitting an electrical contact on a long developer roller sleeve. With the extender device of this invention, there is no limit in the maximum allowable press length that may be pressed with an arbor press, and thus, a small ½ ton arbor press with the extender device of this invention may press a part of a greater length than a large 5 ton arbor press without the extender device of this invention which saves a lot of money.

An electrobushing will be introduced that is a bushing for truing rotational motion of a developer roller while at the same time acting as an electrically contacting device. This simplifies number of parts and makes a stronger connection and thus may obsolete the use of spring with contact.

SUMMARY OF THE INVENTION

Accordingly, it is object of this invention to show an improved contact receiving device that not only improves rotational trueness of developer rollers, but also is a link in the electrical contact's connection, thus making improved toner cartridges and improved image forming apparatuses.

It is yet a further object of this invention to show an improved contact receiving device to improve rotational trueness of developer rollers.

It is an further object of this invention to show an arbor press extender device to increase the length that a press-fit may be performed.

It is a further object of this invention to show an arbor press extender with modular fixtures and fixture holders that receive each end of the developer roller including an electrical contact that may be press-fit.

It is still a further object of this invention to show an arbor press extender with fixtures that receive each end of the developer roller including an electrical contact that may be press-fit.

It is yet a further object of this invention to show modular fixtures to fit into fixture holders to allow quick change from one type of press-fit to be performed to another with minimal set-up time between press-fit styles and sizes.

It is yet a further object of this invention to show quick snap-on/snap-off fixtures and fixture holders for quick connect/quick disconnect of fixtures to fixture holders where fixtures may be held firmly in place without falling off the fixture holder using the concept used in quick connect air hose connections.

It is yet a further object of this invention to show modular fixture holders and fixtures for press fitting applications that quickly install and uninstall using air-hose quick-connect couplers and nipples.

It is yet a further object of this invention to show modular fixture holders and fixtures for press fitting applications that quickly install and uninstall using a small piece of hose in the bore of the fixture module to make a tight yet removable quick connection.

In carrying out this invention in the illustrative embodiment thereof, an arbor press is equipped with an extender device to increase the maximum allowable part length that may be pressed. This not only eliminates the need for using a larger press by allowing a smaller press to be used for pressing long parts, which also saves money, but some parts which may be too long to fit on a much larger arbor press may now be pressed on a small arbor press. Modular quick-connect/quick-disconnect fixtures may be used to fit in fixture holders for holding firm different types of parts and different styles of developer rollers which may now be press-fit using this extender device of this invention. With this extender device, even extremely long parts may be press-fit economically which opens new doors for applications using arbor presses in many industries as a result of this invention. Even an adjustable length arbor press extender may be used for variable extender length for multiple applications with one extender device. An electrobushing is a bushing that conducts electricity to a developer roller in a toner cartridge which is a component of an image forming apparatus or directly in an image forming apparatus for improved toner efficiency, darker print, more even print and an improved system.

BRIEF DESCRIPTION OF THE DRAWINGS

This invention, together with other objects, features, aspects, and advantages thereof, will be more clearly understood from the following description, considered in conjunction with the accompanying drawings.

FIG. 6 shows an isometric view of a prior art developer roller sleeve, showing the shaft and inside the contact end of the developer roller.

FIG. 7 is an isometric view of an aftermarket bushing used to receive the electrical contact which functions with the electrical contact to make electrical connection.

FIG. 8 shows an isometric view of a metal bushing for receiving the end of a developer roller that prevents wobble, trues rotation and may optionally act as a link in the electrical contact's connection, shown prior to the press-fit of the aftermarket electrical contact.

FIG. 24 is an isometric view of an upper fixture holder with a male fixture module attached.

FIG. 25 is an isometric view of a male fixture module.

FIG. 26 shows a cutaway isometric view of an arbor press with foam in the arbor press opening to prevent the magnetic developer roller from getting damaged.

FIG. 27 shows a cutaway top view of an arbor press with foam in the arbor press opening to prevent the magnetic developer roller from getting damaged.

FIG. 29 shows a prior art universal quick connect coupler for making an air hose connection that is capable of receiving the three quick connect different style nipples in the figure.

FIG. 35 is a digital image showing a cutaway of a typical hose material.

FIG. 36 shows a small piece of hose used to fit in the bore of a modular fixture holder for quick installation and removal of removable fixtures.

FIG. 44 shows an isometric cutaway view of a waste toner hopper.

FIG. 45 shows a typical image forming apparatus.

FIG. 46 shows an end-view cutaway of a typical waste toner hopper.

FIG. 47 shows a cutaway enlargement of a photoreceptor and a developer roller and shows the charging in the typical case and is not to scale.

COMPLETE DESCRIPTION OF THE PREFERRED EMBODIMENT

Figure 39:
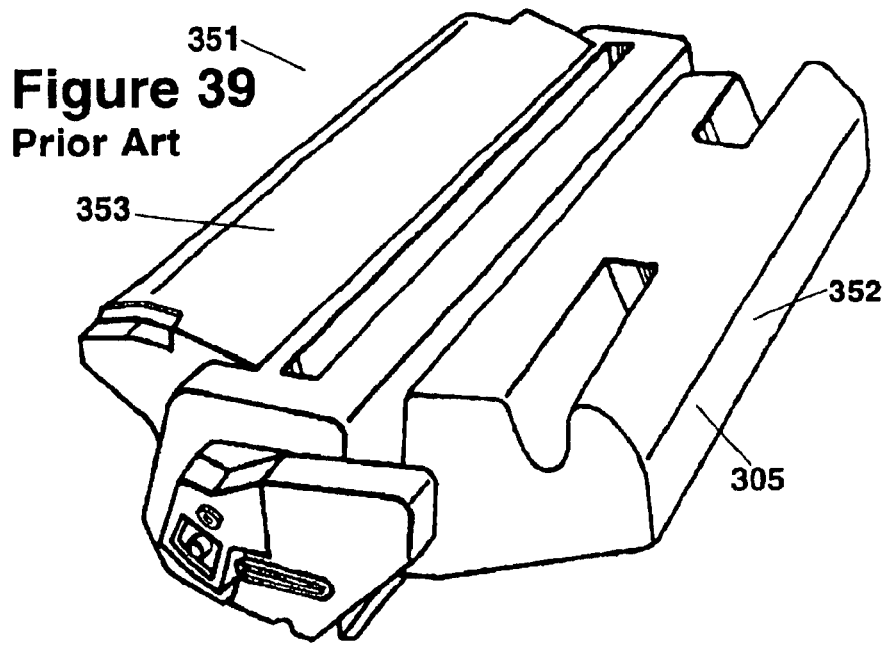
FIG. 39 is an isometric view of a typical toner cartridge.
Figure 40:
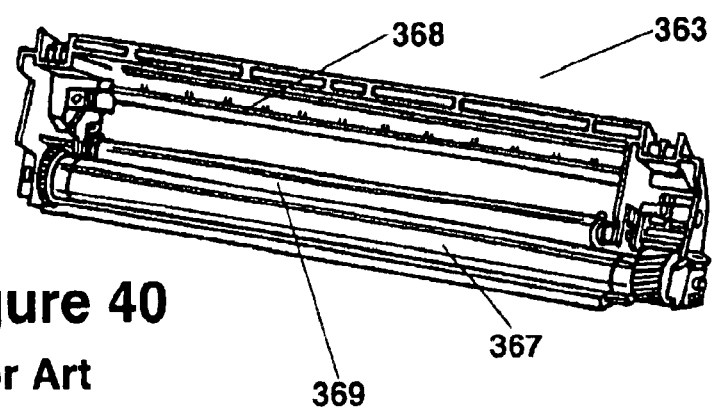
FIG. 40 is an isometric view of a waste toner hopper.
Figure 41:
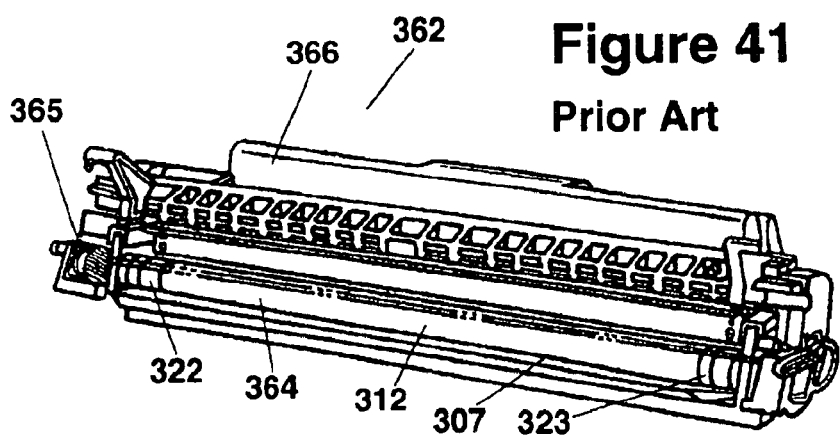
FIG. 41 is an isometric view of a toner hopper.
Figure 42:
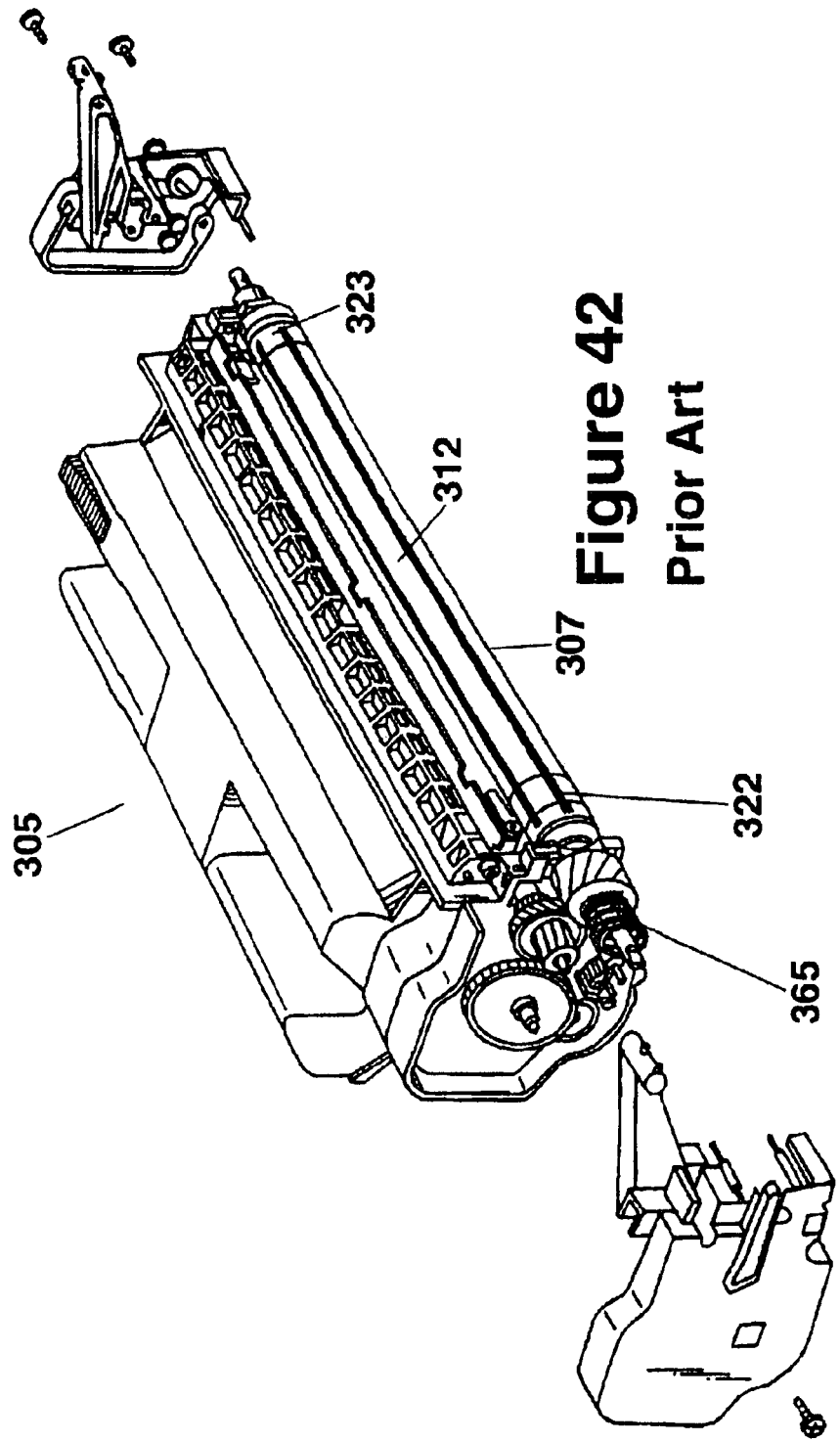
FIG. 42 is an isometric breakdown of a toner hopper and its components.

FIG. 45 shows a typical image forming apparatus 350 which may be either a printer, a copy machine or a facsimile machine. Some image forming apparatuses use a toner cartridge 351 shown in FIG. 39 while others have all components built into the image forming apparatus 351. The toner cartridge 351 is typically made up of two components, the toner hopper 352 and the waste toner hopper 353. FIGS. 40–41 show another set of toner hopper 362 and waste toner hopper 363. The toner hopper has a developer roller 364 and a contact 365 and a tank 366. The waste toner hopper 363 has a photoreceptor 367, a charge roller 369 and a waste tank 368. FIG. 47 shows a theoretical developer roller 307 showing the magnet core 310 inside the developer roller 307.

Figure 43:
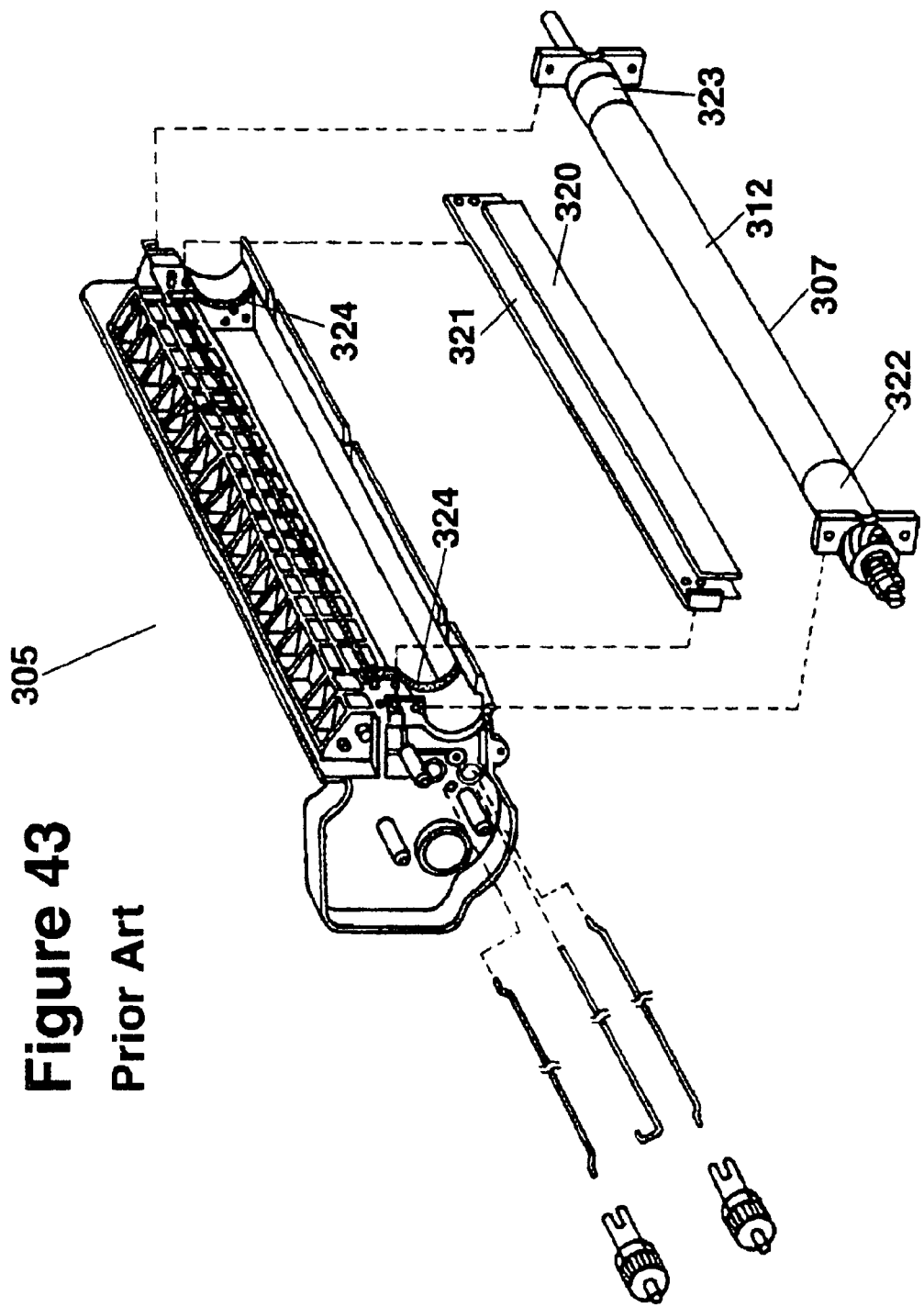
FIG. 43 breaks down more components of a toner hopper so that you may see the components that were covered up inside the toner hopper.

The toner is attracted from the developer roller 307 to the photoreceptor drum 308 as illustrated in FIG. 47. The toner 309 is composed of black plastic resin bound to iron particles. The developer roller 307 has a magnetic core 310 so the toner particles are attracted to it. As the roller 307 rotates with toner 309 on it, the doctor blade 306 controls the thickness of toner on the surface of the developer roller 307. Newer devices use a urethane spreader blade 320 held in place by being on a metal assembly 321 as shown in FIG. 43. The plastic toner particles receive a negative surface charge by rubbing against the developer roller because the roller 307 is connected to a DC supply. The electrostatic charge on the particles attracts the toner 309 particles to uncharged portions of the photoreceptor drum 308 that have removed charge from pixels of light. The charged areas of the photoreceptor drum repel the toner particles. An AC potential on the developer roller 307 helps move the toner 309 to the photoreceptor drum 308 at the desired uncharged areas yet helps toner come back to the developer roller 307 from charged areas of the drum 308 to improve density and contrast because the AC charge alternates.

The roller 307 has a non-print region 322 and 323 shown in FIG. 43. In this nonprint region 322 and 323, the developer roller 307 is smoother than the toner transport section 312 of the roller 307. Toner is not allowed to adhere to the surface of the roller 307 in the nonprint region 322 and 323. Typically, a felt pad 324 forms a semicircle, partially around the roller 307 and seals off the end of the roller 307 to prevent toner leakage from the assembly 305. The smooth felt pad 324 keeps the nonprint region 322 of the roller 307 clean or free of toner and other debris. Also, in some models, a plastic member (not shown) attached to the doctor blade 306 has an extension (not shown) which scrapes toner from the area of the non-print region 322 and 323 of the roller 307.

In older toner cartridge assemblies like SX, the all-metal doctor blade is charged the same as the developer roller bias, and is on the same circuit, and similarly the frame of the NX doctor blade is charged.

It should be noted that the toner transport section 312 of the developer roller 307 cannot be an electrical contact point for two reasons. First, it has a rough surface, typically etched and sandblasted with glass beads or other special treatment such as a conductive coating. Secondly, the section 312 has a continual layer of toner on it. This toner is ready to be transported to the photoreceptor drum.

FIGS. 44 and 46 show another waste toner hopper 401. The waste toner hopper has a wiper blade 402 or cleaning blade 402 with a sharp cutting edge 403. The waste toner hopper has a tank 404. There is a recovery blade 405, sealing blade 405 or keeper blade 405 that acts as a seal so that as waste toner is scraped into the waste tank 404, the toner will fall through the opening 406 between the cleaning blade 402 and the recovery blade 405. The recovery blade 405 has a pickup magnet 407 nearby to pick up any toner that may leak out when the enduser removes the toner cartridge 351 from the image forming apparatus 350 for any reason.

Figure 1:
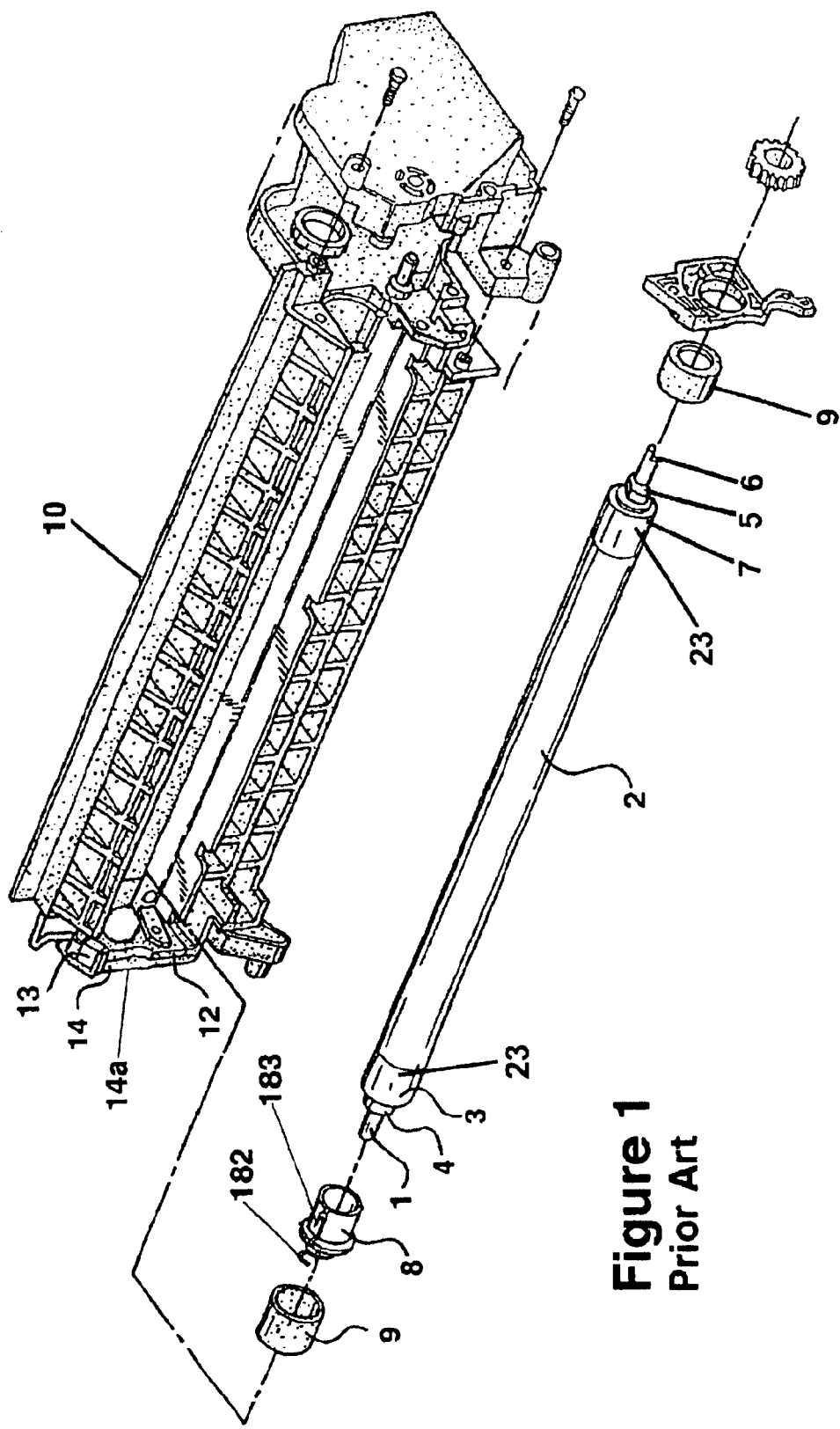
FIG. 1 is an isometric view of a prior art toner hopper assembly showing the breakdown of the developer roller and OEM electrical contacts and end fittings.

FIG. 1 is a broad illustration of the EX toner hopper 10 used in the HP LASERJET series 4 printer. The developer roller 2 has an end 3 from which the magnetic core 4 and magnetic core shaft 1 extend and the developer roller has another end 7. At the opposite end of the developer roller 2 from the magnetic core shaft 1 is the magnetic core shaft 6 and which is smaller than the magnetic core 5 in diameter. The prior art insulative-plastic developer roller contact device 8 fits into the end 3 of the developer roller 2. The magnetic core shaft 1 and 6 are unitary with the magnetic core 5. A white plastic insulative bushing 9 fits over the end 3 of the roller 2 and the contact device 8. An alignment piece 12 (shown in FIG. 2) with an opening aligns the entire connection relative to the metal contact plate 14 mounted on the end-cap 14a of the toner hopper assembly 10 The metal contact plate 14 connects the contact device 8 with a printer contact 13, which in turn connects with the printer's electronic circuitry. The contact device 8 has a wire. At one end the wire 182 touches and makes contact with the contact plate 14. At the other end the wire 183 touches and makes electrical contact with the inner wall of the developer roller 2.

This is a very poor bias voltage contact system. As a result of the poor contact, the printed image lacks quality after the spring wire 182 and 183 loses its resiliency, either where the spring wire 182 and 183 touches the contact plate 14 or where the spring wire 183 contacts the inner wall of the developer roller sleeve 2.

The spring wire is continuous from 182 where it rotates on the contact 8 and at the same time contacts the contact plate 14 to 183 where it contacts the inner wall of the developer roller sleeve 2. Alternately, the spring wire 182, 183 may get insulated either by toner or oxidation from aging, environment and extreme use. The more the contact device 8 is used, the worse the image gets. Another contributing factor is the aged and used surface of the developer roller 2. However, the wire 182, 183 deteriorates and gradually the image degrades in steps, however, when this process is combined with the conditions of the developer roller's 2 surface, it is a defective like a shotgun shooting out of two barrels at the same time with multiplying effects. However, the contact from the wire 182 to the metal contact plate 14 is poor in the first place because wire is thin and also there is not a lot of spring wire surface area to contact. There is just a small point to make contact with the ring of the end-cap assembly (FIG. 3B) and a small point 183 to contact the inner wall of the developer roller 2. Consequently, it is an accident waiting to happen. As the spring wire 182 and 183 loses resiliency in time, it loses its contact effectiveness. The same is true where the spring wire 183 contacts the inner wall of the developer roller 2. As time passes and more print cycles are completed, the spring wire 182, 183 loses its resiliency and the integrity of the contact of the spring wire 182, 183 to the inner wall of the developer roller 2 is detrimentally affected to the point where the print quality of the image degrades.

The contact device 8, and thus the spring wire 182 and 183 rotate with the developer roller 2. The spring wire 182 moves relative to the metal contact plate 14. The mechanical motion makes the spring wire 182 even more susceptible to loss of resiliency, oxidation, dust, toner and wear.

Figure 2:
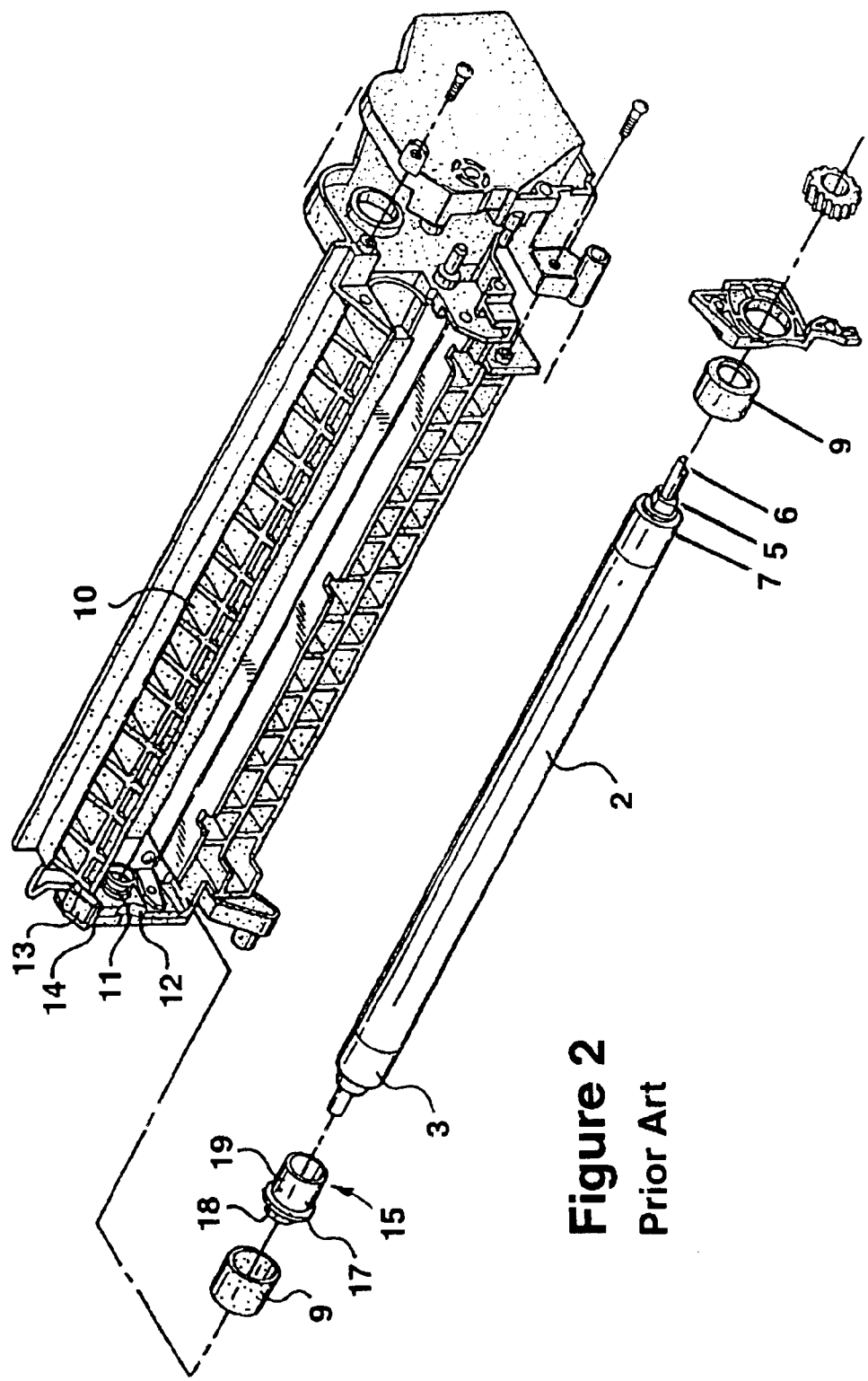
FIG. 2 is an isometric view of a prior art toner hopper assembly showing the breakdown of the developer roller and some aftermarket electrical contacts and end fittings.
Figure 3:
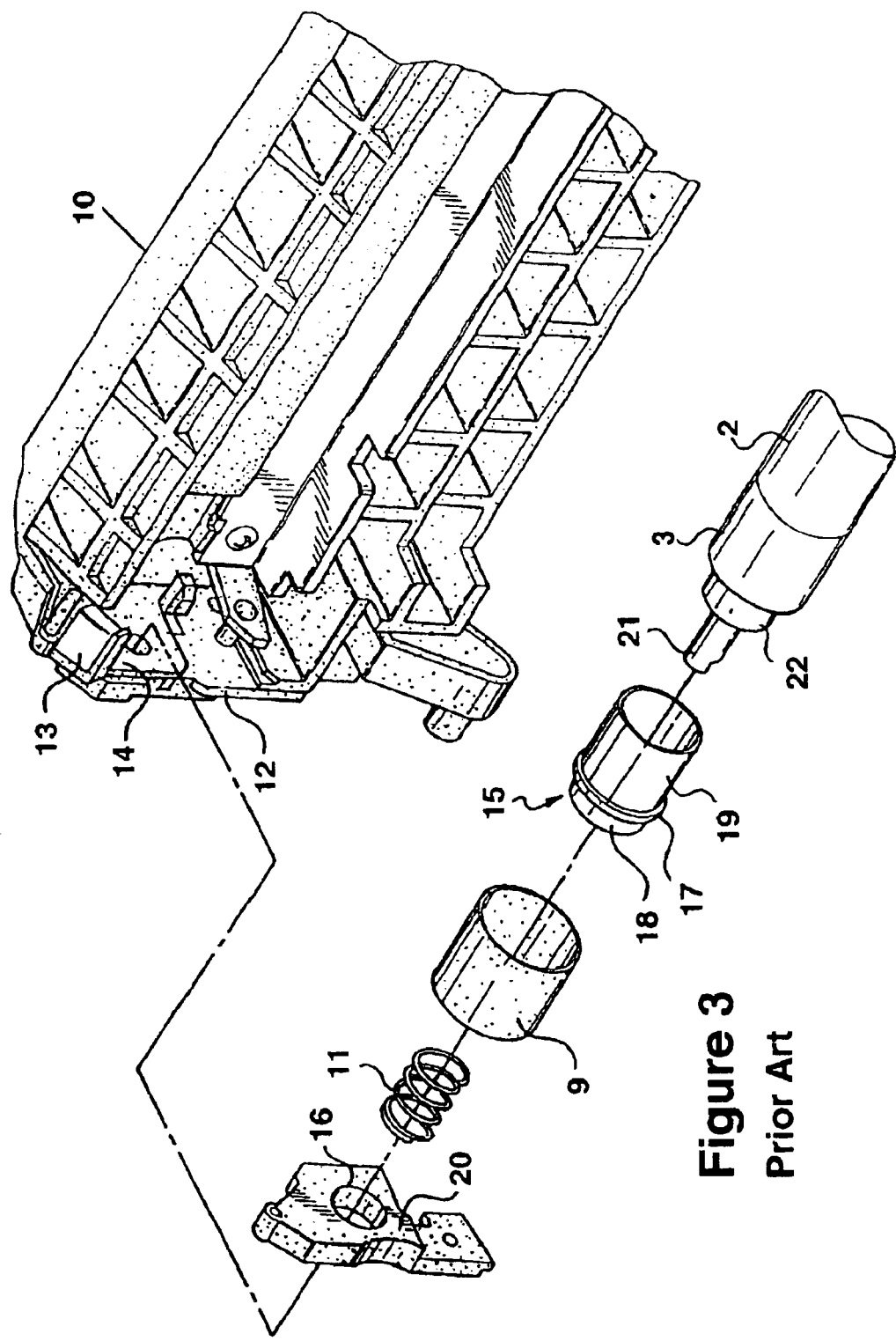
FIG. 3 is an isometric view of a prior art toner hopper assembly showing the breakdown of the developer roller and some aftermarket electrical contacts.

These problems led to the development of the devices shown in U.S. Pat. No. 5,634,175, and improvement of the contact device for use in the EX toner hopper assembly 10. FIGS. 2 and 3 show the contact device 15, the first aftermarket device for the EX toner hopper. The contact device 15 comprises a metal bushing with a large diameter portion 19 sized to fit into the end 3 of the developer roller 2 where the large diameter portion 19 of the contact device 15 is completely inserted into the developer roller 2, providing additional electrical surface area between the contact device 15 and the roller 2.

FIG. 2 is a broad illustration of how the developer roller contact device 15 is connected with the toner hopper assembly 10. In one optimized design, the large diameter portion 19 is inserted into the end 3 of the roller 2, and the plastic bushing 9 is slipped over the roller end 3 and contact device 15. The small diameter portion 18 is then pressed against the coil spring 11 and into the opening 16 in the insulative alignment piece 20, and the developer roller 2 is mounted on the toner hopper assembly 10. The contact device optionally may have a rim 17. FIG. 3 is an enlarged view of the relevant end of the toner hopper assembly 10 to more clearly illustrate the contact device 15 connection. The alignment piece 20 and coil spring 11 are shown separated from the assembly 10 for clarity. The outer surface of the large diameter portion 19 of the contact device 15 may be adhered by glue or conductive glue to the inner wall of the developer roller 2. However, for best results, a press fit would make the best electrical contact, much better than gluing the contact. Also by press-fitting the contact 15, the contact, which in this case also acts as an alignment shaft, will have a more true rotational motion. The developer roller has a nonprint region 23 on one end and there is also a nonprint region on the other end. The magnet core reduces in diameter first at reference number 22 and then it reduces further to form a magnet core shaft 21.

Figure 4:
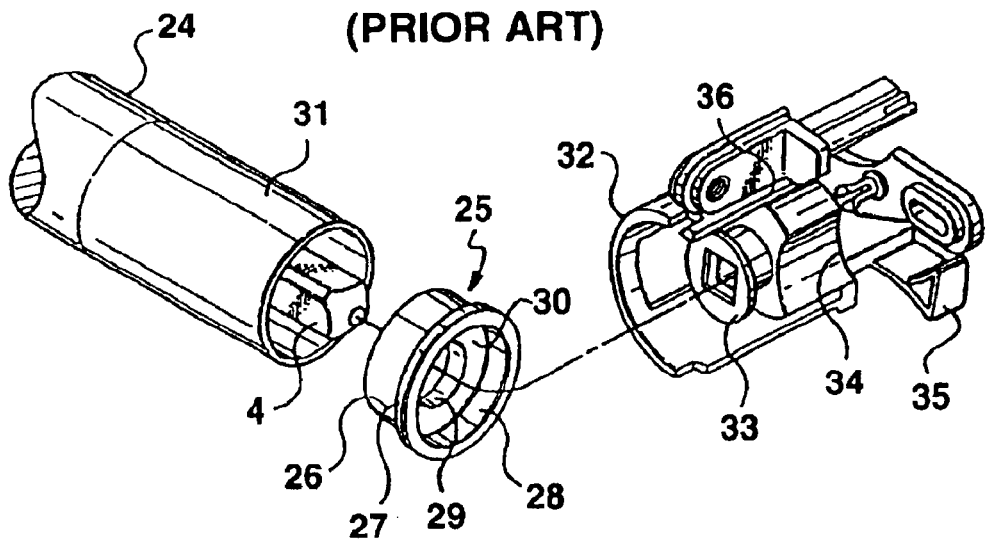
FIG. 4 is an isometric view of an end portion of a prior art toner hopper assembly showing the breakdown of the contact end of the developer roller, some aftermarket electrical contacts and the printer contact.
Figure 5:
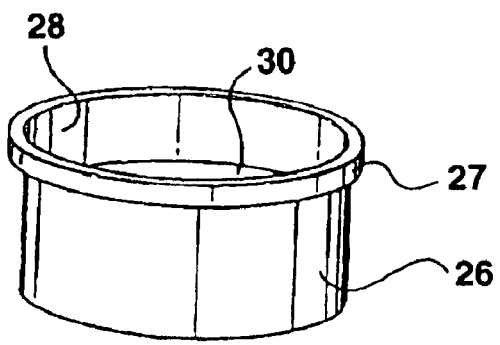
FIG. 5 is an isometric view of an aftermarket electrical contact.

FIGS. 4 and 5 show another contact device 25 from inventor's U.S. Pat. No. 5,634,175 used in the LX toner cartridge. The contact device 25 comprises a cylindrical member 26 with a rim 27. The cylindrical member 26 has an outside diameter sized to snugly fit inside the end 31 of the developer roller 24. The rim 27 is sized to abut against the end 31 of the developer roller when the cylindrical member 26 is completely inserted within the developer roller 24. The interior of the contact device 25 has two portions. The first portion 28, adjacent the rim end of the contact device 25, has an inside diameter sized to slide over the washer 33 in the printer electrical contact 36. The second portion 29 has an inside diameter sized to fit around the end of the magnetic core's shaft 4 within the developer roller 24. A contact surface 30 is formed where the interior portions 28 and 29 meet in a linear direction. The contact surface 30 remains in contact with and rubs against the face of the washer 33 which is unitary with the projection 35 which connects with the printer's electronic circuitry within the printer electrical contact 36 when the developer roller contact device 25 rotates with the developer roller 24. This specific printer electrical contact 36 also has an insulative plastic cap 32 and an insulative plastic assembly 34 within the printer contact device 36.

It has been found that the developer roller contact device 25 works well, fitting by snugness without adhesive. However, it has been tested using adhesive to adhere the contact device 25 within the end 31 of the developer roller 24 and there was no ill effect. When using adhesive, one must be careful not to create an insulative layer that would prevent contact. The only purpose of glue is to prevent the contact device 25 from spinning within the developer roller sleeve 24 which would machine a groove within the roller. Conductive adhesives may be used. However, it has been found that using a press-fit contact 25 eliminates the need for glue, improves the contact and makes for a more true rotation of the developer roller sleeve 24. With the developer roller contact device 25, electrical contact with the developer roller 24 is maintained not only where the rim 27 abuts against the end 31 of the roller 24, but also where the cylindrical member 26 touches the inner wall of the roller 24.

For any such contacts, a very small amount of conductive grease should be applied wherever rotating parts make electrical contact with stationary parts and vice versa. There are two basic types of conductive greases in the aftermarket, white grease and black grease. Black grease measures conductivity with an ohmeter and white grease does not. However, white grease nonetheless performs as well even though it does not measure actual conductivity and solves the problems that conductive grease is there to solve, i.e., stability of contact, prevention of contact-loss, arc prevention and corrosion resistance. Inventor introduced the first aftermarket conductive grease to the toner cartridge remanufacturing industry in an article he wrote that was published in *Recharger* in 1992. Black grease has the major disadvantage that by the end of a cartridge remanufacture cycle, the black grease forms a hard layer on the outer surface and thus requires cleaning between every recharge cycle. However, hardened black grease does remain conductive when transformed to the hardened solid state. It is because of the cleaning requirement of the black grease that is a costly nuisance that has convinced inventor that the black grease is not recommended and that the white grease is. By the end of a toner cartridge cycle, the white grease is partially gone, thus sacrificially doing its job, but does not require any cleanup of components like black grease does.

It has been found that the best manufacture of such electrical contacts 15 and 25 may be made using a press-fit rather than requiring the use of a glue. Thus the tolerances must be plus and minus 0.005 inches in the typical case in dimensions that involve press fit for the EX developer roller 2. This is the tolerance available in manufacture without taking special precautions that would otherwise increase the manufacture costs of the contacts 15 and 25.

FIG. 6 shows a developer roller 37 of the HP-4000 toner cartridge. The roller has a left side 38, a right side 39, a metal shaft 41, a right side bushing 44, a right side 45 of metal shaft 41, a left and right end 43 and 46 of metal shaft 41 and an inner bore 42. It can be seen in the figure that just to the right of the inner bore 42, the bore dimension of the developer roller sleeve 37 is smaller in diameter. Thus, the inner bore 42 is a counter bore in the smaller bore to the right. It is in this inner bore 42 where the plastic OEM contact fits in the HP-4000 developer roller 37 (not shown). This OEM contact is essentially the same as the EX contact 8 shown in FIG. 1. The OEM contact 8 rotates in a plastic wearable modular receiving bore assembly not shown. The problem is that the modular receiving bore assembly made of plastic can enlarge in bore size and thus cause the developer roller 37 to have a slight wobble. This slight wobble would cause the developer roller to have chatter and appear worn prematurely. In other cases, the out-of-round modular receiving bore assembly can cause the developer roller to physically contact the metal of the magnetic end-seal (not shown) that replaces the end-felts of old. When the developer roller touches the magnetic end-seal, you can kiss the developer roller sleeve 37 goodbye because the metal along the side of the end-seal will machine a groove into the soft aluminum developer roller sleeve 37. This is almost the same as putting the developer roller sleeve 37 on a lathe and having a metal tool cut into the aluminum tube 37.

Figure 37:
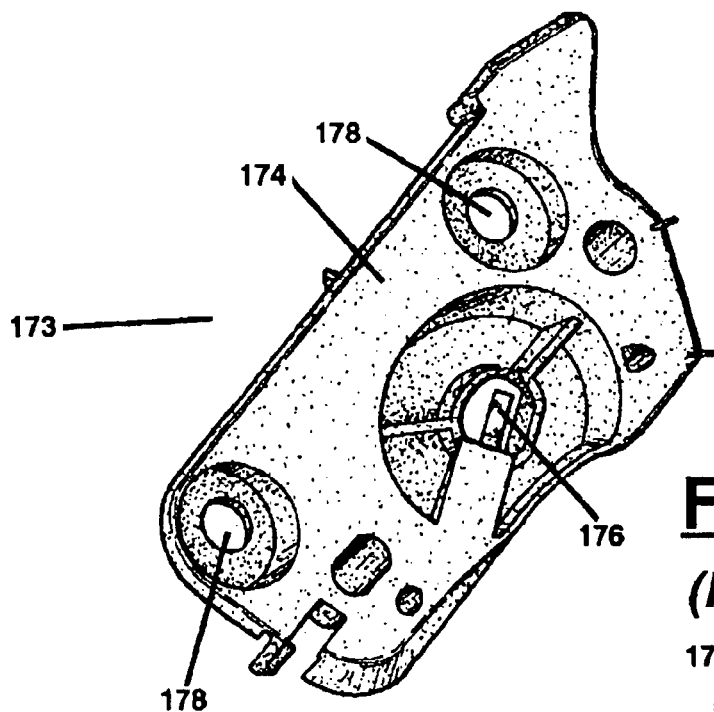
FIG. 37 shows the outside view of an endcap assembly of a developer roller assembly showing the printer contact.
Figure 38:
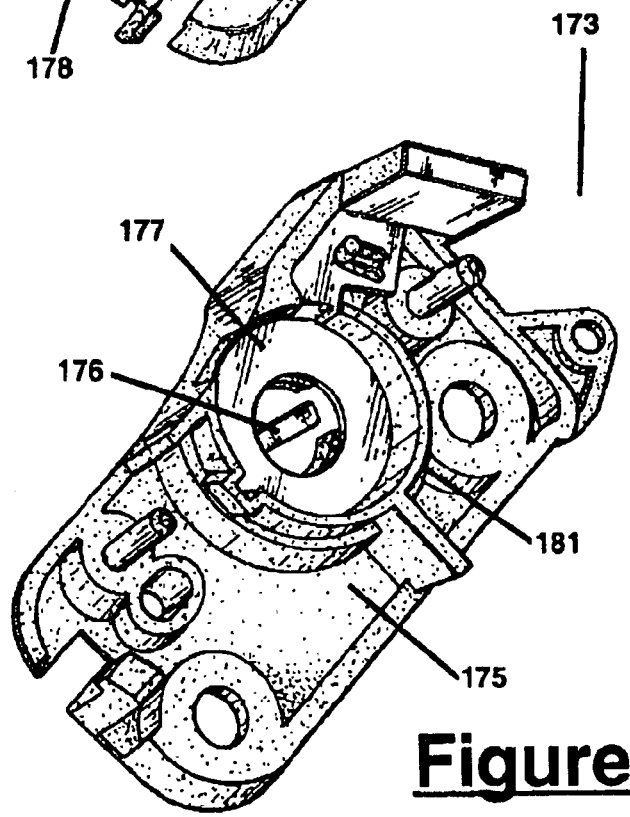
FIG. 38 shows the inside view of an endcap assembly of a developer roller assembly showing the printer contact attached to the ring contact.

FIG. 7 shows the electrobushing 47 that is designed to replace the removable all-plastic OEM receiving bore assembly. It looks similar in shape, but the electrobushing is metal or conductive plastic and the modular receiving bore assembly has different shapes on the outside for fitting into the end-cap assembly 173 (FIGS. 37 and 38) with a groove to lock into the end-cap assembly 173. The electrobushing 47 was made in a simpler way to decrease manufacturing costs and thus roundness is the key. However, the electrobushing was made to make contact with the left end 53 to the printer contact 173 and thus was designed a little longer in length than the OEM plastic bushing. By being a little longer the electrobushing 47 will make tighter fit of the developer roller 37 in the toner hopper, but will maintain electrical contact by being tighter. The electrobushing 47 has a rim 49, a left surface of rim 48, or a flat ring shaped portion 48, a bore 50, a cylindrical portion 51, a circle portion 52 where the cylindrical portion 51 joins the rim left surface 48. The end-cap 173 has two holes 178, to hold it in place, a metal flat spring contact 176 which connects to a contact ring 177, all in one metal piece. The left end 53 of the electrobushing 47 is longer than the OEM's plastic bushing design so that, unlike the OEM bushing, the electrobushing left side 53 makes contact with the metal contact ring 177 for better electrical contact. The OEM plastic bushing fits inside the plastic sleeve receiving wall 181 as does the electrobushing 47. The printer electrical contact assembly 173 has an outer surface 174 and an inner surface 175 and each plastic insulative surfaces.

FIG. 8 shows an exploded view of the electrobushing 47, the new contact 54 and the developer roller 66. The electrobushing 47 is designed not only to prevent the out-of-roundness of the OEM plastic bushing that can cause problems after the inner bore enlarges, but also helps the functioning of the contact 15. However, the contact bias voltage contact 15 has been slightly improved by the bias voltage contact 54 of, which is designed more optimally for a press-fit. Both contacts 15 and 54 are identical except for the two steps 55 and 57 shown on the bias voltage contact 54. The contact 54 has a smaller portion 55 (the first step) on the press-fit side, a right end 56, a larger portion 57 (the second step) of the press-fit cylindrical portion, a joining portion 58 where the larger portion 57 joins the smaller portion 55, a rim 59, a second joining portion 60 where the rim 59 joins the larger portion 57, s flat 61 surface of rim 59, an alignment portion 62, a bore 63 in the alignment portion, and an end surface 64 in the alignment portion 62. The press-fit contact 54 has a second bore (not shown) through the smaller portion 55 and the larger portion 57 that is larger than the diameter of the magnetic core (not shown) on the shaft 41. The press-fit contact 54 is to be press-fit onto the developer roller sleeve 66 which has an inner bore 42, a left rim 68, and a counter bore portion 69 of the inner bore 42. A counterbore may be made in the developer roller sleeve 66 which results in an outer bore portion 69 and an inner bore portion begins at 42 where the inner bore diameter in this example is identical to the original diameter of the developer roller sleeve prior to putting the counterbore in it. It is clearly seen in FIG. 8 that the larger portion 57 of the bias voltage contact 54 fits in the outer bore portion 69 and the smaller portion 55 of the bias voltage contact 54 fits in the inner bore past reference 42 where the diameter is smaller. The fit may be any kind of fit desirable for the application which includes a loose-fit, free-fit, medium fit, snug-fit, wringing-fit, tight-fit, medium-force-fit, heavy-force-fit, shrink-fit, press-fit, interference fit, or any kind of fit whatsoever without limit. There is not limit in what tightness may be used to fit the bias voltage contact device 54 or any other bias voltage contact device in this patent application into the developer roller.

Please note that for any bias contact device 54, it may also be called a cylindrical member, flange, double-cylindrical member or any name whatsoever. Note that with the multi-diameter contact 54, a press-fit or other fit may be achieved in two diameter portions which add structural rigidity, more true roundness, a more true fit, a more true round developer roller cylinder, better electrical contact, more stable rotation, increased surface-to-surface touching for a better electrical contact for a more stable rotation. Note that the contact device 54 may be implemented either on the drive side or on the non-drive side of the developer roller. With the two-diameter step, a greater fit may be achieved with or without the press-fit as even a loose fit may be implemented, although there is no limitation. Of course, if it is used on the drive side, a gear would probably be placed on the small diameter portion, depending on the operating requirements of the environment.

Figure 9:
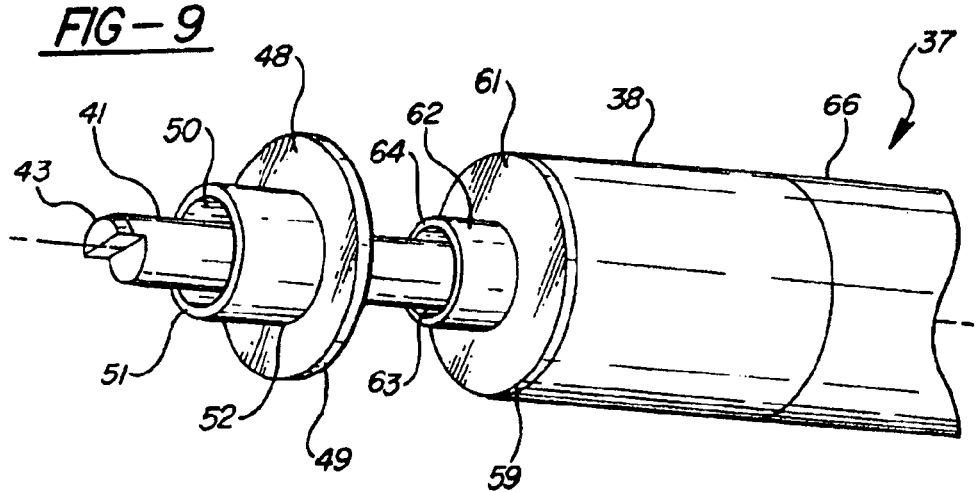
FIG. 9 shows an isometric view of a prior art developer roller sleeve end, showing the shaft, new and improved electrical contact and metal bushing after the electrical contact is press-fit in place.
Figure 10:
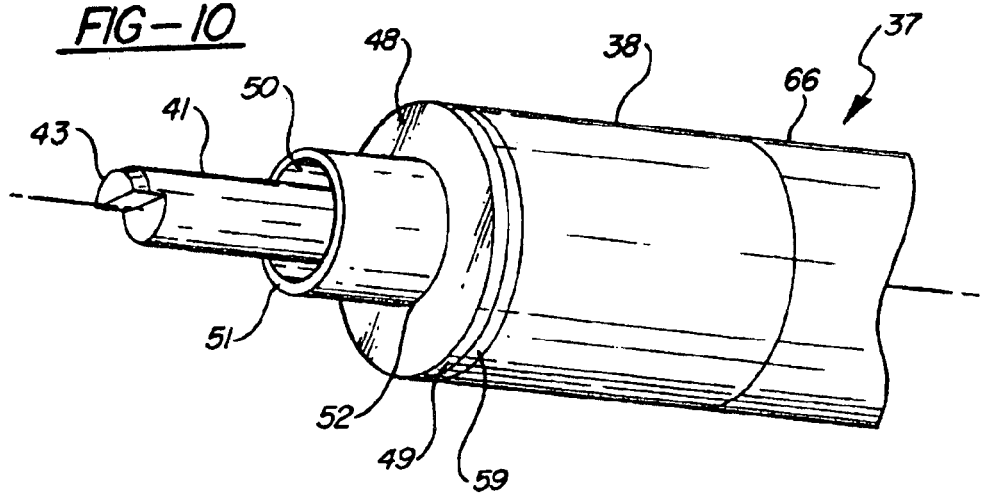
FIG. 10 shows an isometric view of a prior art developer roller sleeve end, showing the shaft, new and improved electrical contact and metal bushing after the electrical contact is press-fit in place and metal bushing is in proper position.

FIG. 9 is an exploded view of the electrobushing 47 with respect to the developer roller sleeve 66 with the contact 54 already press-fit into the developer roller 66. FIG. 10 shows the same as FIG. 9 with everything in place including the electrobushing 47. The press-fit of the contact 54 may be done with a hammer. However, by hammering the contact 54 into the inner bore 42 of the developer roller sleeve 66 may cause problems. For example, the contact, made of steel, brass or bronze can cause score and scratch marks into the inner bore 42 of the developer roller sleeve 66 and can cause out-of-roundness of the developer roller sleeve 66. Thus, it is a good idea to press-fit the parts with a press instead of a hammer. The least costly and common presses used for press-fits are arbor presses. They are used by mechanics in garages to press-fit bearings and other mechanical fittings that require a press-fit. With an arbor press, a tremendous amount of pressure may be exerted with a very small exertion on the part of the operator by using leverage and a gear. Although much larger arbor presses exist, the most commonly available arbor presses range from one half to five ton pressure rating. Most any tool supply house for the machining industry, tool industry and automotive industry sells arbor presses. Arbor presses are readily available most anywhere in the USA and are relatively inexpensive. Most importantly, arbor presses are more safe than power driven presses because the operator uses his or her hand to increase or decrease the pressure.

Figure 11:
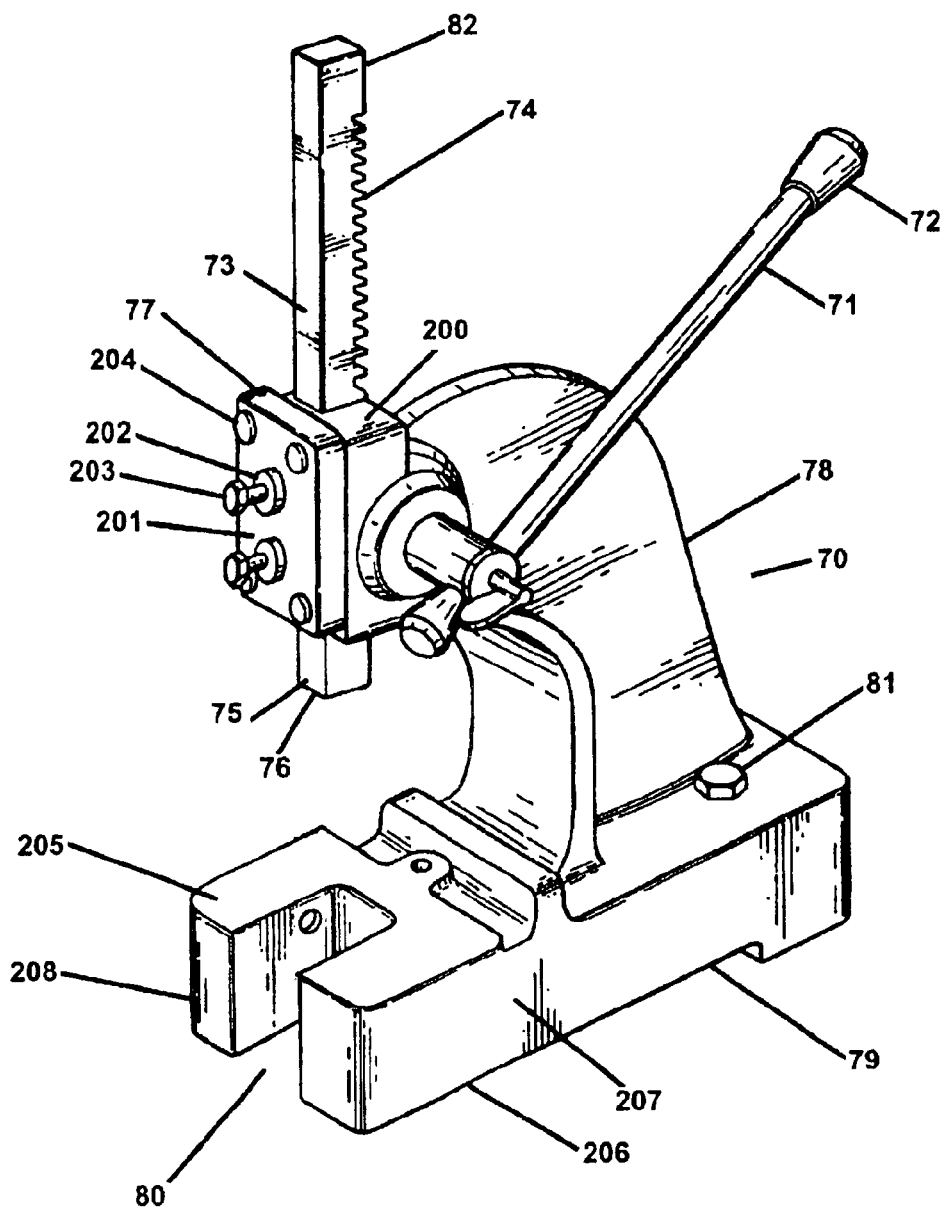
FIG. 11 shows an isometric view of a typical prior art arbor press that can be found at most tool supply distributors.

FIG. 11 shows a typical arbor press 70. A typical arbor press 70 has a handle 71 for manually exerting leverage pressure, and the handle has a rubber end 72 at each end. The arbor press 70 has a straight ram assembly 73 with gear teeth 74, a straight non-gear portion 75, a ram 76, and a top non-geared portion 82. The typical arbor press contains the straight ram assembly 73, a cap 77, handle 71, a neck 78, a base 79 with a base opening 80, a tightening bolt 81 to attach to the bench which goes through a bore (not shown) in the base 79. Prior art FIG. 11 shows that the ram guide 200 is attached to the neck 78 of the arbor press 70. The cap 77 is secured to the ram guide 200 using four holding bolts 204 tightening the face 201 of the cap 77. The cap 77 secures the ram 73 in the ram guide 200. The tightness of the ram 73 inside the ram guide 200 is controlled by the tightness setting of the cap positioning bolt 203 which may be locked in position with the cap position lock nut 202. The base or support structure 79 has a top 205, a bottom or underside 206, a right side 207 and a left side 208.

All structural portions are thick, especially the base 79 and the neck 78. There is one major flaw in these popular arbor press devices 70. The first flaw is that they are heavy. A ½ ton arbor press weighs over eight pounds. The second flaw is that arbor presses are designed for small parts. If the automotive industry uses the arbor press for press-fitting bearings, then they don't have to be capable of press-fitting long parts. The typical arbor press 70 limits in press-fit length are from the bottom of the cap 77 to the top of the base 79. However, the maximum part length is shorter yet because the figure does not show the metal piece that comes with most arbor presses to cover up the base opening 80 to enable press-fitting. By removing this metal cover of the base opening, parts may extend down to the workbench to gain another 2–3 inches in length of a part to be pressed with an arbor press 70. The only solution prior to this invention was to use a different kind of a press or use a larger arbor press. There is a large difference between a ½ ton arbor press and a 5 ton arbor press in cost and weight. There is not a large difference between a ½ ton arbor press and a 5 ton arbor press in length of a part to be pressed. Even so, why should a person or a company have to purchase an over-powered arbor press at great expense to do a small job just because an arbor press is too short. It is simply because arbor presses, which are mass produced to keep costs down, are not designed for applications outside the range of height simply because most users of arbor presses do not need to press a long part. Those that need to press a longer part are in the minority and must find an alternative that is not an arbor press. Inventor did not find an alternative, but instead made an extender device that attaches to an arbor press to increase the length of a part that may be pressed with an arbor press. However, the extender device 83 may also be installed in brand new arbor presses, or even cast into the arbor press and is not limited just what is described in this invention.

Figure 12:
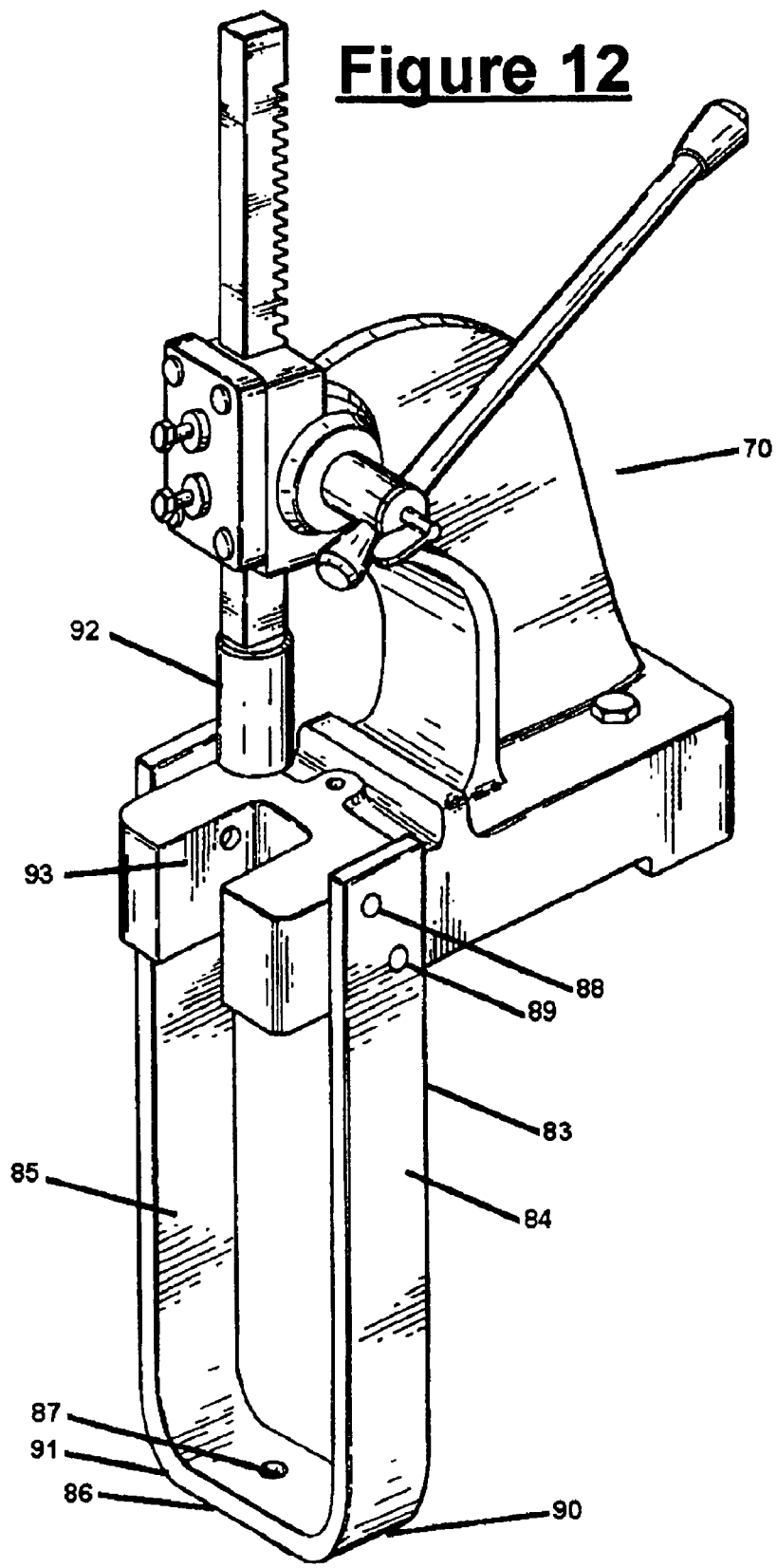
FIG. 12 shows an isometric view of an arbor press with the new extender added to the arbor press also showing the upper fixture holder module.
Figure 13:
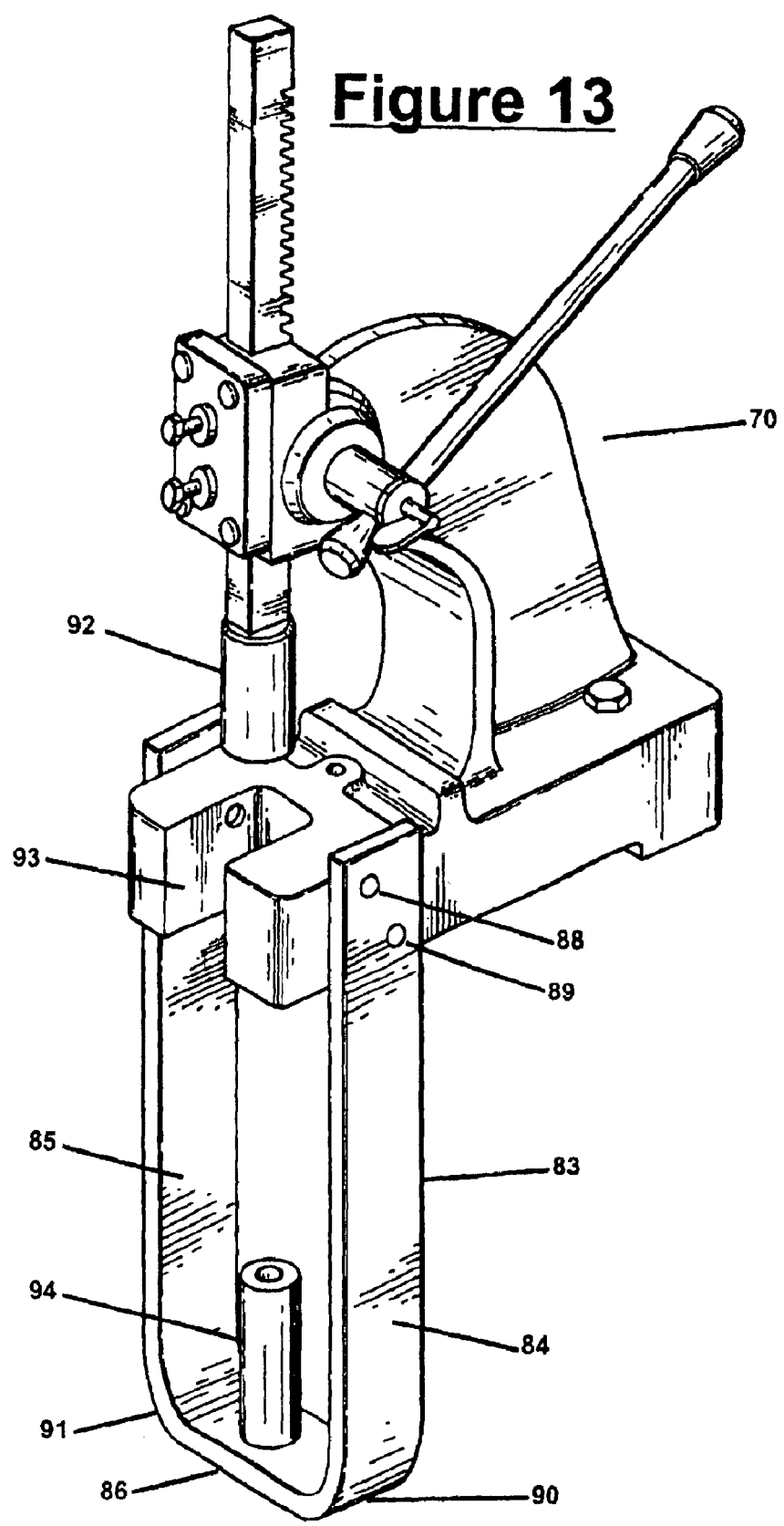
FIG. 13 shows an isometric view of an arbor press with the new extender added to the arbor press, also showing the top and bottom fixture holder modules.

FIG. 12 shows an arbor press with an extender assembly 83 used to increase the length of parts that may be pressed. The extender assembly 83 has a right leg 84 and a left leg 85, optionally a fixture attach bore 87 which may optionally be threaded, a base 86, a left bend 91, a right bend 90, and two attach holes 88 and 89. Alternately, and extender assembly may be made with multiple sets of attach holes 88 and 89 to make an extender assembly 83 with multiple length settings. The holes may be replaced with one or more slots that can be used to adjust the height of the extender. Holes are drilled and tapped into the base 79 of the arbor press 70 at holes 88 and 89 to enable the bolting attachment of the extender assembly 83 to the arbor press 70. There is an upper fixture holder module 92 on the ram 76 of the arbor press for attaching fixtures that position the parts to be pressed to insure that the press fit will be straight and proper. FIG. 13 shows the same modified arbor press with a lower fixture holder module 94 for holding a variety of fixtures for different applications, also to insure that the press fit will be straight and proper, used in tandem with the upper fixture holder module 92. Also shown in the figure is a inner surface 93 of the base opening region 80.

Figures 14, 15:
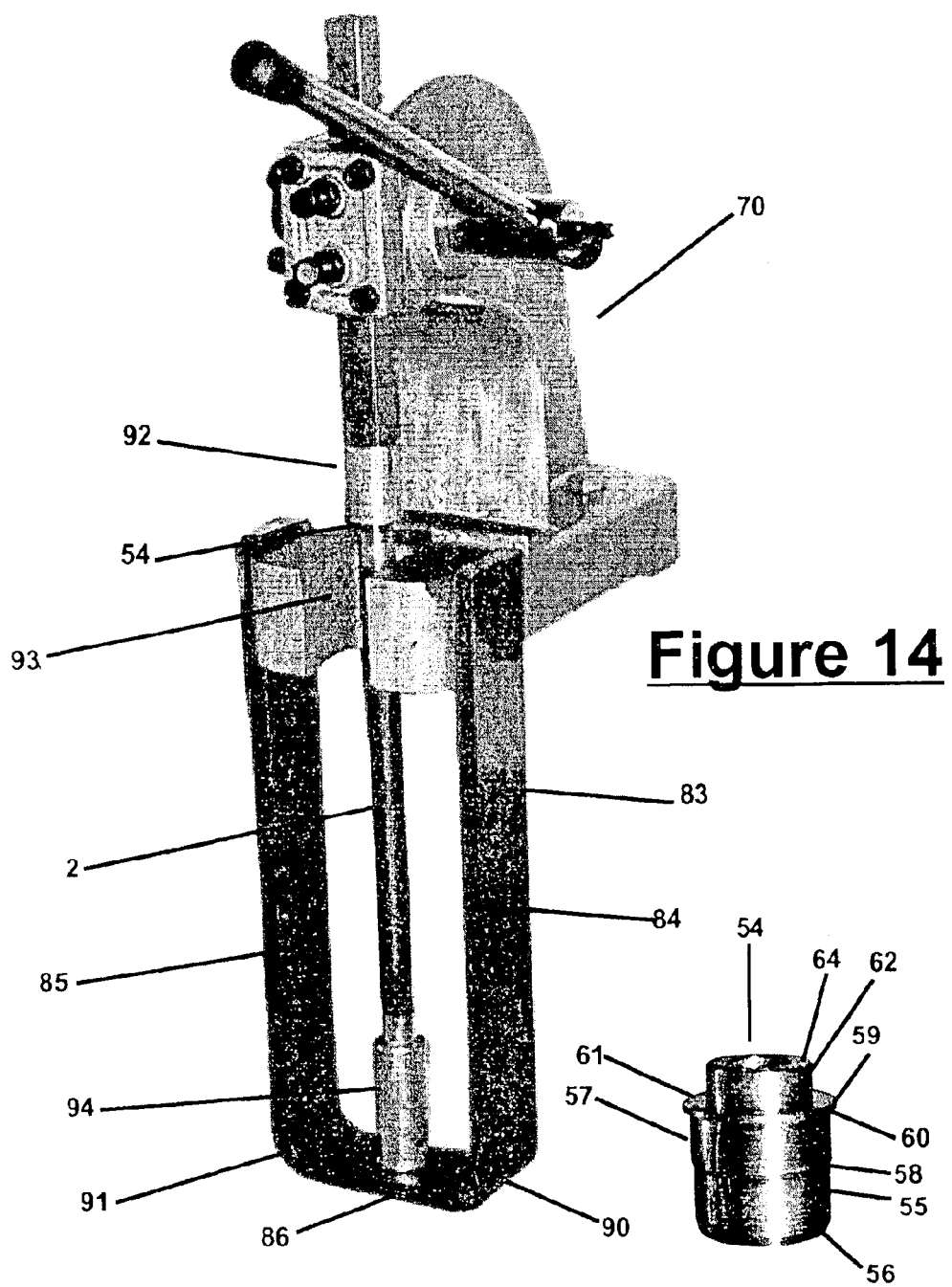
FIG. 14 shows an isometric view of an arbor press with the new extender added to the arbor press, also showing the top and bottom fixture holder modules with a developer and aftermarket contact in place.
FIG. 15 is an isometric view of a new and improved aftermarket electrical contact.

FIG. 14 shows a laser printout of a digital image of the arbor press 70 with the extender assembly 83, the upper and lower fixture holder modules 92 and 94, a developer roller 2, and a press-fit contact 54 being press-fit. FIG. 15 shows a laser printout of a digital image of the press-fit contact 54 that is used in FIG. 14 because this contact 54 is difficult to see in FIG. 14. This figure shows that even though the upper fixture holder module 92 and the lower fixture holder module 94 are meant to hold modular fixtures to firmly hold parts to be press-fit at top and bottom, the fixture holder modules 92 and 94 may also be used as fixtures as in FIG. 14. By causing the fixture holder module to be based on a widely used size, then all the fixture holders can fit into that size to economize on the number of fixtures required to fit into the fixture holders. Different embodiments of these fixtures will later be described.

The extender assembly 83 is actually very simple. Some of the best pioneer inventions are simple. The extender assembly 83 is comprised of flat bar cold rolled steel flat bar ⅜ inches thick and 1 and ¾ inch wide. The extender 83 has two right angle bends at 90 and 91. Other dimensions would also work. However, inventor will manufacture this with the above dimensions for strength purposes but does not want to limit invention to these dimensions. The extender assembly 83 should function properly with almost any dimensions as long as it increases the length of a part that an arbor press can press.

Figure 16:
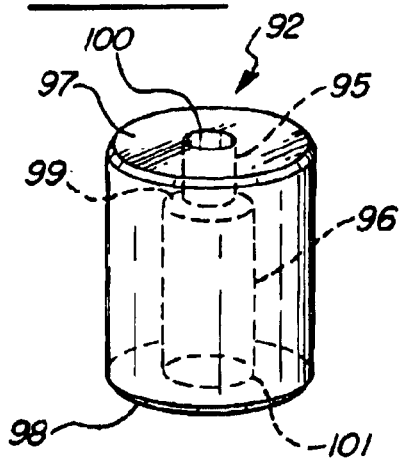
FIG. 16 is an isometric view of an upper fixture holder.
Figure 17:
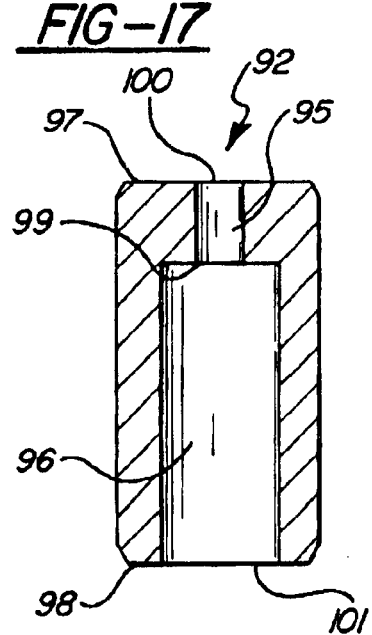
FIG. 17 is a cutaway view of an upper fixture holder.

FIGS. 16 and 17 show the upper fixture holder module 92 which has a small bore 95, a larger bore 96, a top 97, a bottom 98, a bore joining disk region 99, a top 100 of the smaller bore 95 and a bottom 101 of the larger bore 96. This fixture holder may be bolted through the bores 95 and 96 to the ram 76. It is easiest to use a bolt that may be tightened with an ALLEN wrench, the ALLEN wrench made to fit into the larger hole 96 to allow turning the bolt. Optionally, the small bore 95 may be tapped, however, it is easier to drill and tap a bore into the ram 76 to attach the upper fixture holder module 92.

Figure 18:
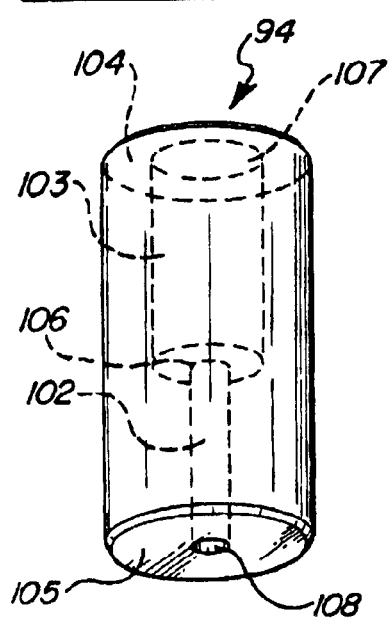
FIG. 18 is an isometric view of an lower fixture holder.
Figure 19:
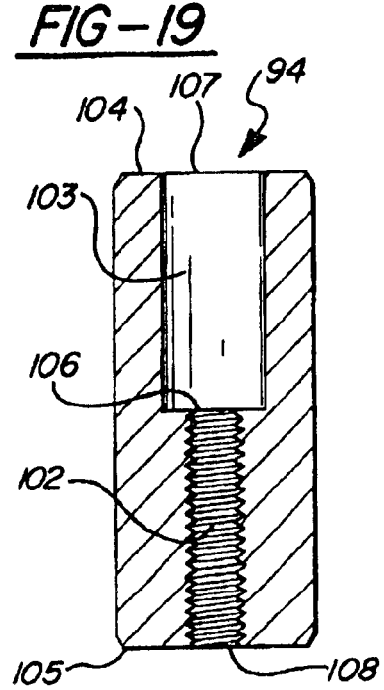
FIG. 19 is a cutaway view of an lower fixture holder.

FIGS. 18 and 19 show the lower fixture holder module 94 which has a small bore 102, a larger bore 103, a top 104, a bottom 105, a bore joining disk region 106, a bottom 108 of the smaller bore 102 and a top 107 of the larger bore 103 This fixture holder may be bolted from below the bottom 105 into the small bore 102, preferably threaded as shown in FIG. 19. The small bore 102 may be tapped to attach the lower fixture holder module 94 to the base 86 of the extender assembly 83 on an arbor press 70.

Figure 20:
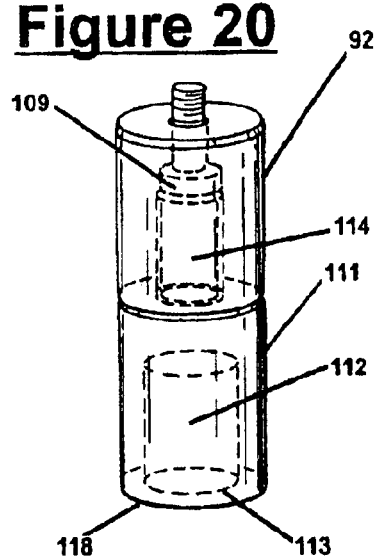
FIG. 20 is an isometric view of an upper fixture holder with a fixture module attached.
Figure 21:
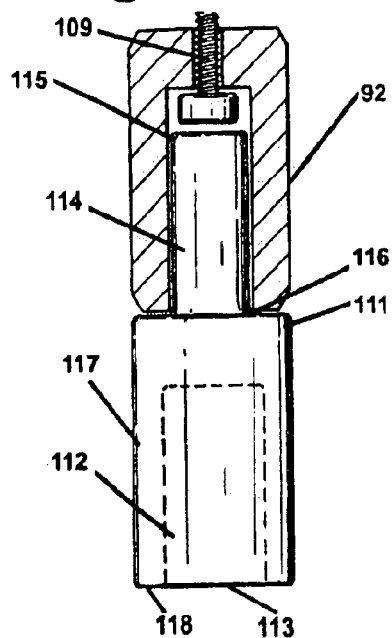
FIG. 21 is a cutaway view of an upper fixture holder with a fixture module attached.

FIGS. 20 and 21 show the upper fixture holder module 92 with an upper fixture 111 attached from the bottom 98 of the upper fixture holder module 92. A bolt 109 is shown to attach the upper fixture module 92 to the ram 76. The fixture 111 has a bore 112 to receive the end of any parts to be press-fit. The bore 112 has a bottom 113 where the press-fit part may be inserted. When the press-fit part is steel or other material that is attracted by a magnet, the fixture 111 may be made magnetic so the press-fit part can stay in by magnetism. One way to do this is to make the fixture 111 of steel and to magnetize it although the same may be done by using magnetite or magnetic steel. The fixture 111 has an upper fixture stem 114 and the stem 114 has a top 115. The fixture has a base 117 and a stem join base region 116, and a bottom 118 of the base 117. It is not just that the bore 112 is designed to "fit parts" as earlier stated, but some parts to be pressed may have protrusions that stick out and the bore 112 is designed to accommodate these protrusions as well as make a nice fit.

FIG. 35 shows a typical rubber hose material 165. In this figure it has three layers 166, at the outer layer, 167 in the middle layer and 168 at the inner layer. FIG. 36 shows a hose 169 cut to length and designed to go into the larger bore 96 of the upper fixture holder module 92. With this hose positioned tightly in the larger bore and optionally glued, upper fixtures 111 may be quickly slipped in the bore 172 of the hose 169 by placing the stem 114 of the upper fixture 111 snugly in the hose's 169 bore 172 to fit snugly into the inner wall 179. The hose 169 has a bottom 170, a top 171 and an outer surface 180. This upper fixture 111 may be quickly installed and uninstalled when different fixtures 111 which are used for press-fitting different parts are required.

Figure 22:
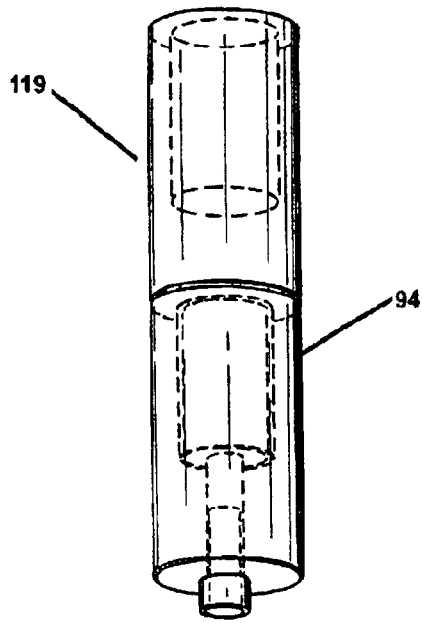
FIG. 22 is an isometric view of an lower fixture holder with a fixture module attached.
Figure 23:
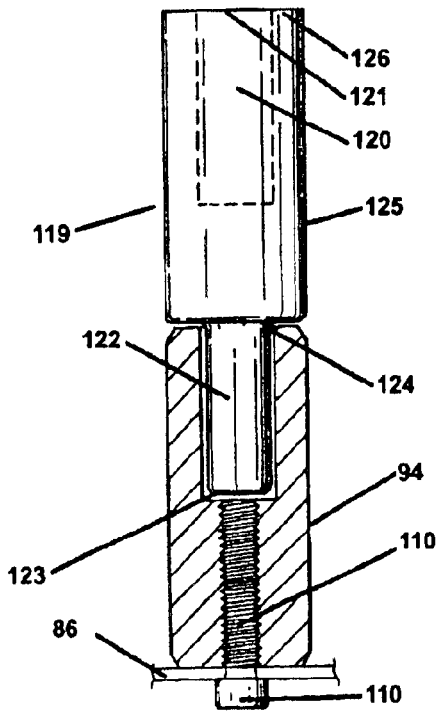
FIG. 23 is a cutaway view of an lower fixture holder with a fixture module attached.

FIGS. 22 and 23 show the lower fixture holder module 94 with a lower fixture 119 attached to the top 104 of the lower fixture holder module 94. A bolt 110 is shown to bolt the lower fixture module 94 to the base 86 of the extender assembly 83. The fixture 119 has a bore 120 to fit the end of any parts that stick out to be press-fit. The bore 120 has a top 121 where the press-fit part may be inserted. When the press-fit part is steel or other material that is attracted by a magnet, the fixture 119 may be made magnetic. One way to do this is to make the fixture 119 of steel and to magnetize it although the same may be done by using magnetite or magnetic steel. This might not be necessary since gravity will hold the component in, but it is an option. The fixture 119 has a lower fixture stem 122 that fits into the large bore 103 of the lower fixture holder module 94 and the stem 122 has a bottom 123 The fixture has a top 126 and a stem join base region 124 and an outer surface 125.

The hose 169 may optionally fit in the larger bore 103 of the lower fixture holder in order to have a quick install and uninstall for the lower fixture 119 for changing fixtures quickly and effortlessly when press fitting different sized fixtures, for example, on a manufacturing production line. This is certainly quicker than bolting and unbolting components. Any type of hose may be used in this embodiment or other embodiments using hose. Single layer hose may be used, multilayered hose may be used, and any hose may be used, so long as it protects the surface of the developer roller 2 from scratching or other damage. For example, some of the hose materials that may be used are rubber, urethane, urethane rubber, air hose, water hose, cooling hose, automotive hose, air conditioning hose, compressed air hose, fish-tank tubing, garden hose, hydraulic hose, neoprene rubber, hard rubber, soft rubber, closed cell foam, open cell foam, among many other hoses, tubes, rubber pipe, molded rubber or extruded rubber. There is no limit in possibilities in types of hoses and tubing to use for the quick connect feature in this and other embodiments. Please note that inventor invented a quick connect lathe adapter set for quickly installing and uninstalling lathe adapters for quick connect shown in U.S. Pat. Nos. 5,309,200 and 5,381,213.

FIGS. 24 and 25 show an upper fixture holder module 92 with an upper fixture 127 attached from the bottom 98 of the upper fixture holder module 92. A bolt 109 (not shown) may be used to bolt the upper fixture module 92 to the ram 76. The fixture 127 may optionally have a bore 129 to attach to the fixture holder 92 with a bolt or other fastener. The fixture 127 has a bottom 184 to be inserted into the press-fit part. For example, this is a male fixture 127 as opposed to the female upper fixture 111. The male fixture 127 may be used to press-fit a component that is female such as the contact 25 shown in FIGS. 4 and 5. The bottom 184 of the fixture 127 inserts into the contact's 25 first portion 28 and abuts against the contact surface 30 of the contact 25 which allows the male fixture 127 to press-fit the contact 25. The same is true of this fixture for any female object to be press-fit in any industry whatsoever and is not limited to the imaging industry. When the press-fit part is steel or other material that is attracted by a magnet, the fixture 127 may be made magnetic so the press-fit part can stay in by magnetism. One way to do this is to make the fixture 127 of steel and to magnetize it although the same may be done by using magnetite or magnetic steel. The fixture 127 has an upper fixture stem 129 (top portion) which has a top 131 and a bore 132. The fixture has a base 184 and a stem joins base region 130 at the base 184's top 128. Although the male fixture 127 is shown as an upper fixture, there could also be a lower male fixture designed the same way but upside down and it would have all the same features, and thus it is hereby incorporated in this patent application by having described the upper fixture 127 to save space. Similarly, the upper fixture 127 may be installed using a hose on the inside bore of the fixture holder 92 and/or 94 so the fixture 127 may be installed and uninstalled quickly into either fixture holder 92 or 94.

Figure 28:
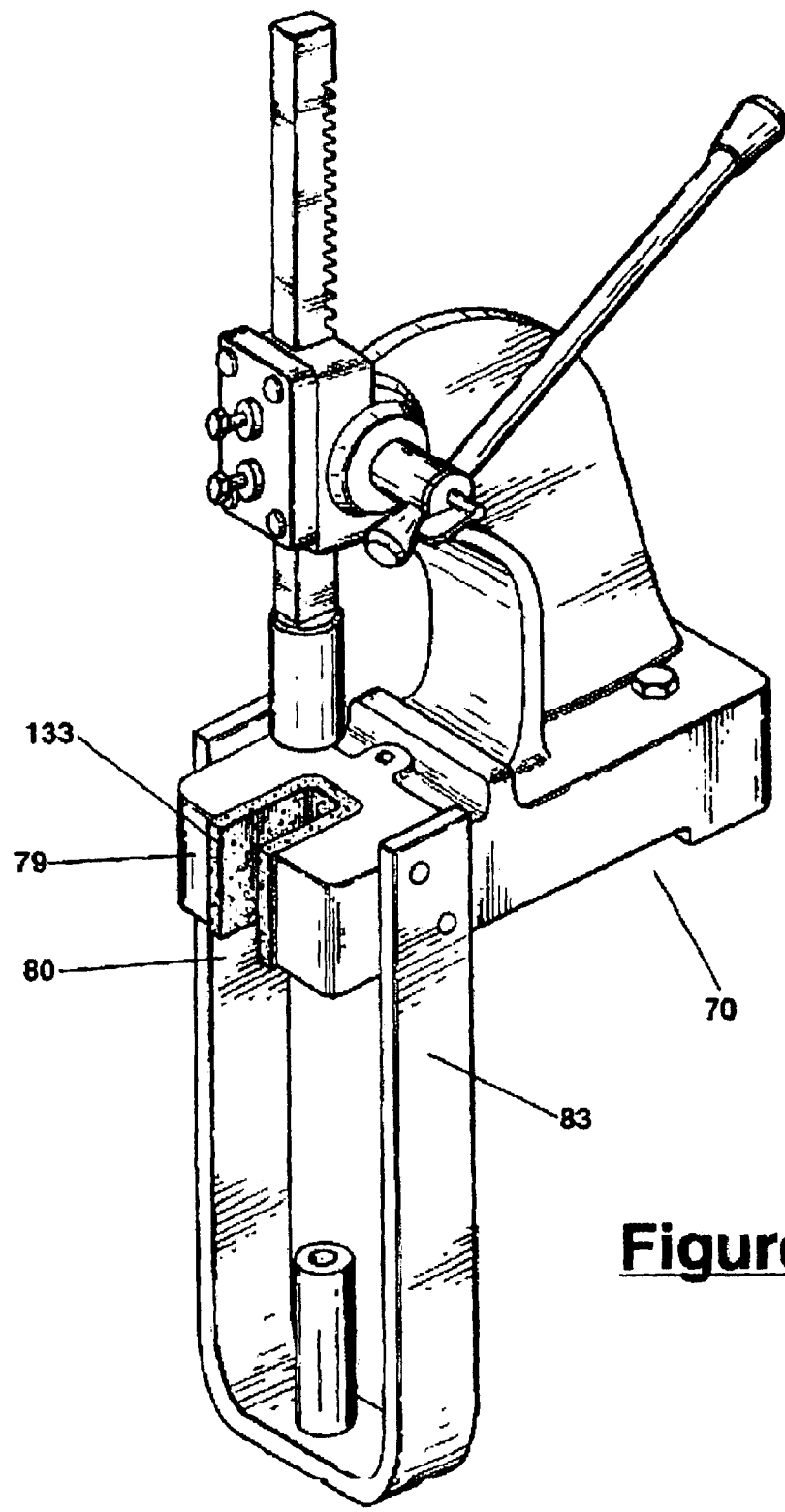
FIG. 28 shows an isometric view of an arbor press with foam in the arbor press opening to prevent the magnetic developer roller from getting damaged.

FIG. 26 shows an isometric cutaway view of the arbor press. When press-fitting developer rollers are placed in the narrow base opening 80 as in FIG. 14, since many developer rollers 2 are very magnetic by design, there is a tendency for the outer surface of the developer roller to strongly attract to the base 79 of the arbor press 70 at the inner surface 93 of the base opening region 80. It is this attraction that can easily score the sensitive surface of the developer roller 2 and cause a print defect. For this reason, some soft material 133 is inserted inside the base opening 80 to prevent damage to the developer roller 2. Many soft materials 133 may be used, for example, ester open cell foam, ether open cell foam, any open cell foam, closed cell foam, foam, rubber, foam rubber, cloth, cotton, fabric, wool, polyurethane, polyurethane foam, any open cell material, any closed cell material, any soft material, any cushiony material. If the poles are known on the developer rollers, like poled magnets may be used in place of the soft material 133 to repel the developer roller from touching the base opening 80. FIG. 27 shows a cutaway top view of the arbor press with the soft material 136 installed to protect the developer roller 2. Soft material 136 may be installed as the figure shows right side soft material 135 and left side soft material 134 in the opening 80 of the base 79 of the arbor press 70. FIG. 28 shows the arbor press 70 with the extender 83 and the installed soft protective material 133, in this case open cell ester foam. I like the ester foam best because my daughter's name is Esther.

FIG. 29 shows a prior art quick connect universal coupler 137, and three different quick connect nipples from the air hose (compressed air) industry. The three quick connect nipples are references 138, 139 and 140, each one different. The universal coupler 137 may be used by any of the nipples 138, 139 or 140, even though each nipple has a completely different design as seen in FIG. 29. There are many more designs of couplers too numerous to mention which are to be incorporated in this invention even though they are not all shown.

Figure 30:
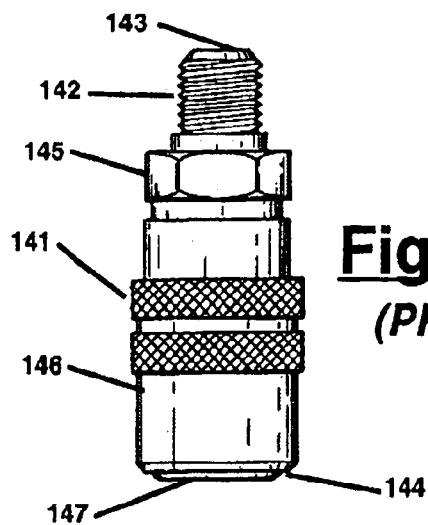
FIG. 30 is a prior art quick connect coupler with male pipe threads at the permanent/semi-permanent connection end.
Figure 31:
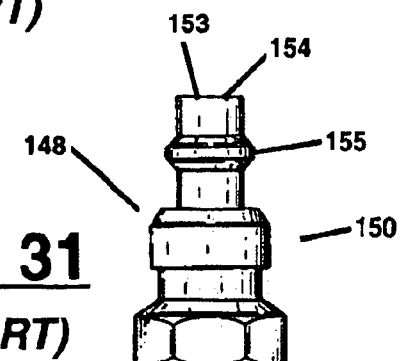
FIG. 31 shows a prior art quick connect nipple with male pipe threads at the permanent/sem-permanent connection end.
Figure 32:
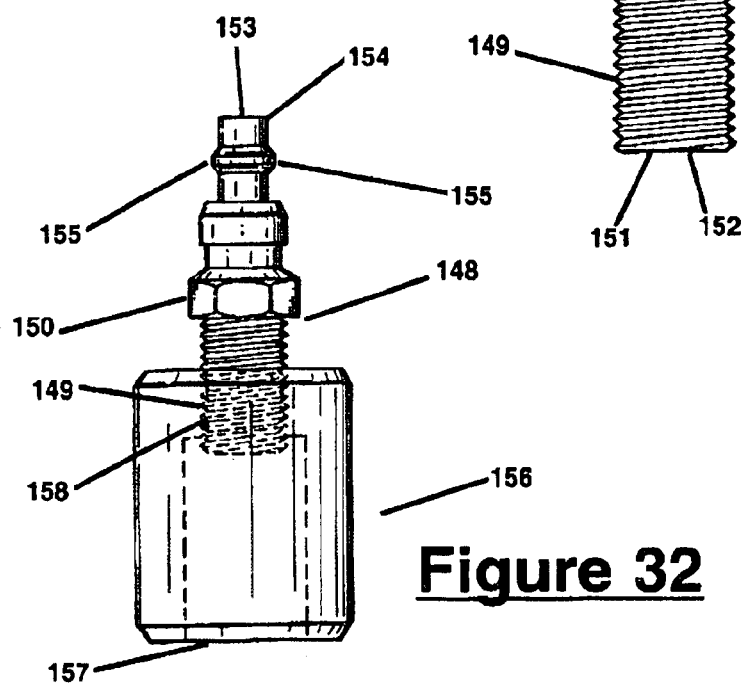
FIG. 32 shows a quick connect upper fixture holder using a coupler for quick connect features.

FIG. 30 shows a typical quick connect coupler 141, different from the one previously shown. The quick connect coupler 141 has a male pipe thread 142 which is more suitable to the application of using a coupler 141 to replace the upper and lower fixture holders 92 and 94. By using a coupler 141 with a male thread 142, the coupler would install into the threaded bore 87 in the base 86 of the extender 83. By simply replacing the lower fixture holder module 94 with a coupler 141, a different quick connect embodiment may be made. The same is true of the upper fixture holder module 92. The coupler assembly 141 may also replace the upper fixture holder module 92 in the ram 76 of the arbor press 70 and the coupler assembly 141 may instead be installed in a hole drilled and taped in the ram 76. In order to use the couplers 137 or 141 as either upper or lower fixture holders, the upper and lower fixtures 111 and 119 must have a hole drilled and tapped in them to receive the male threads 149 of a nipple 148 as shown in FIG. 31. The nipple 148 has a male pipe thread to allow the nipple to screw into a tapped hole in a quick connect fixture 156 as shown in FIG. 32. Please note that the figures show that the nipple 148 has a male thread 149, a hex wrench turn portion 150, a bottom end 151, a bottom bore 152, a top end 153, a top bore 154 and a nipple push lock 155. The coupler 141 has a male pipe thread 142, a thread end 143, a quick connect end 144, a hex-wrench turn portion 145, a sliding ring 146 and a bottom bore 147. The quick connect fixture 156 of FIG. 32 may be used either as an upper or lower fixture and has a first lower bore 157 and a second upper bore 158. The fixture 156 can quickly connect and disconnect from an upper or lower fixture holder 141 coupler (not shown in an arbor press), and a user can acquire a set of fixtures similar to 156, each of a different size and quickly plug them in and out of coupler fixture holders such as 141 located in an arbor press 70 ram 76 or on the threaded hole 87 of the base 86 of an extender 83 for quick changeover on a production line or any work environment.

Figure 33:
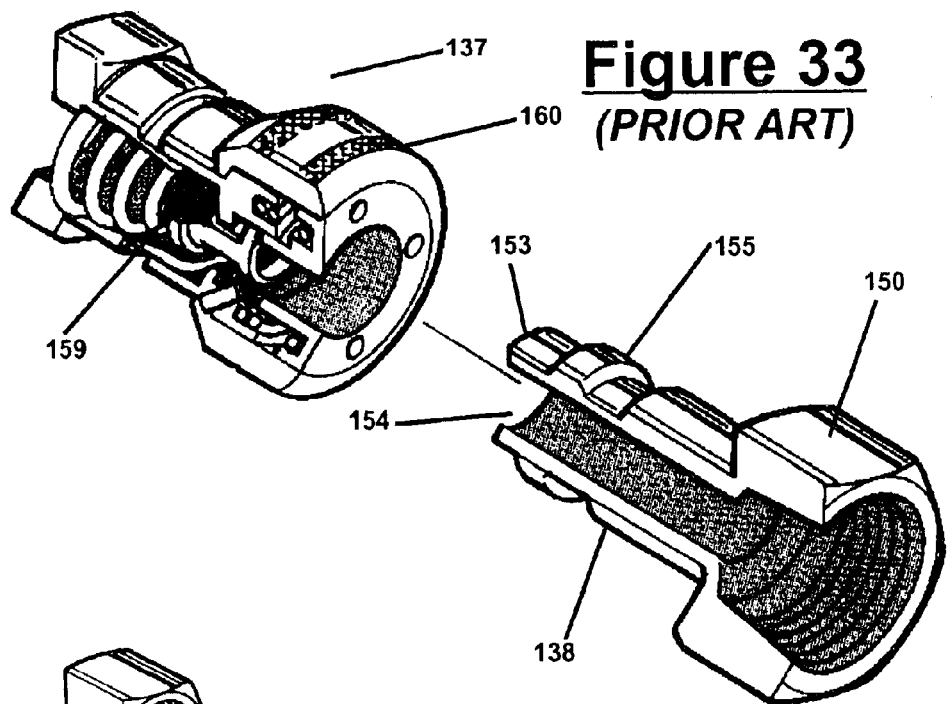
FIG. 33 shows a cutaway isometric view of a typical prior art quick connect coupling and nipple used for connection of air hoses.
Figure 34:
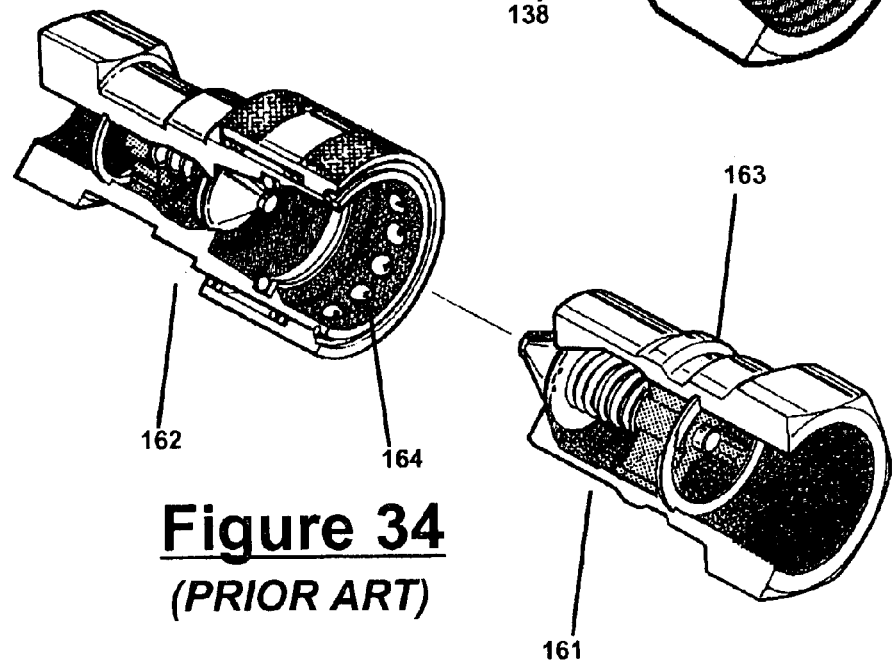
FIG. 34 shows a cutaway isometric view of a typical prior art quick connect coupling and nipple used for connection of hydraulic lines.

FIG. 33 shows a cutaway isometric view of a quick connect coupler 137 and a quick connect nipple 138. Shown in the figure on the nipple 138 is the hex wrench turn portion 150, the top end 153, the bore 154 in the top 153 and the nipple push lock 155. Shown in the figure on the coupler are the precision seal 159 and the knurl 160 for easy gripping. Of course, since the couplers are not used for a compressed air hose, the precision seal is not necessary. To use an existing coupler and nipple that is already equipped with unnecessary features relating to a pneumatic compressed air line does not hurt the performance of using the quick connect coupler and nipple solely for the quick connect features. FIG. 34 shows a cutaway isometric view of a coupler 162 and a nipple 161 from the hydraulic industry, used to quickly connect hydraulic lines. The hydraulic coupler 162 and nipple 161 may also be used similar to the pneumatic coupler 137 and nipple 138 as already described. The hydraulic coupler 162 has a ball locking mechanism 164. The hydraulic nipple 161 has a nipple push lock 163 to secure the nipple 161 into the coupler 162.

Since minor changes and modifications varied to fit particular operating requirements and environments will be understood by those skilled in the art, the invention is not considered limited to the specific examples chosen for purposes of illustration. The invention includes all changes and modifications which do not constitute a departure from the true spirit and scope of this invention as claimed in the following claims and as represented by reasonable equivalents to the claimed elements. Any ideas shown in any embodiments may be incorporated into any other embodiments. Any prior art disclosed may be incorporated with any embodiment disclosed.

What is claimed is:

1. An improved electrical connection device for use in an image forming apparatus comprising of a printer, copy machine or a facsimile machine or a toner cartridge used therein to supply a bias voltage to a developer roller whereby a bias voltage contact fits into the developer roller whereby said bias voltage contact has a first portion that fits into the developer roller and whereby a second portion is cylindrical and rotates inside an electrobushing;

whereby said electrobushing acts as an electrical contact and also as a bearing and has a bore sized to receive said second portion of said bias voltage contact;

wherein a first end of said electrobushing makes electrical continuity with a power supply of the image forming apparatus;

and a second end of said electrobushing receives said second portion of said bias voltage contact and thus said electrobushing makes electrical continuity with said second portion of said bias voltage contact;

and thus said electrobushing not only acts as a bearing but also helps supply electricity to the developer roller.

2. An improved electrical connection device as in claim 1 whereby said electrobushing has a cylindrical portion.

3. An improved electrical connection device as in claim 2 whereby said electrobushing has a rim.

4. An improved electrical connection device as in claim 3 whereby said electrobushing has a flat ring shaped portion formed where said cylindrical portion joins said rim.

5. An improved electrical connection device as in claim 3 wherein said rim has a first flat surface that makes rotational electrical contact with a second flat surface on said bias voltage contact positioned in distance where said first portion and said second portion join but perpendicular to central axis of said first portion and at least the diameter of said first portion.

6. An improved electrical connection device as in claim 1 whereby said electrobushing is made of metal.

7. An improved electrical connection device as in claim 1 whereby said electrobushing is made of conductive plastic.

8. An improved image forming apparatus as in claim 1 wherein said first end of said electrobushing makes electrical contact with a contact ring located on said endcap.

9. An improved electrical connection device as in claim 1 wherein said first portion of said bias voltage contact has both a larger diameter portion and a smaller diameter portion for making a better press-fit.

10. An improved toner cartridge used in an image forming apparatus comprising of a dry toner style printer, copy machine or facsimile machine;

whereby said toner cartridge includes of a loner hopper and a waste toner hopper;

whereby said waste toner hopper includes of a photoreceptor, a cleaning blade, a charging device for electrostatically charging said photoreceptor and a container so receive waste toner;

whereby said toner hopper includes of a storage tank, an endcap and a developer roller, whereby a bias voltage contact fits into said developer roller;

whereby said bias voltage contact has a first portion that fits inside said developer roller and has electrical continuity with an inner wall of said developer roller;

whereby a second portion of said bias voltage contact has a region that is cylindrical in shape; and whereby said cylindrical region of said second portion of said bias voltage contact is of a smaller diameter than said first portion and rotates in an electrobushing;

whereby a first end of said electrobushing has a bore to receive said cylindrical portion of said second portion of said bias voltage contact in such a way such that said electrobushing acts as a rotational bearing of said cylindrical region of said second portion of said bias voltage contact;

and said electrobushing also has electrical continuity with said bias voltage contact;

and a second end of said electrobushing makes electrical continuity with a power supply of the image forming apparatus;

and thus the power supply of the image forming apparatus supplies a bias voltage which electrically connects to said electrobushing which electrically connects to said bias voltage contact which electrically connects to said inner wall of said developer roller;

whereby said developer roller thereby receives said bias voltage;

and thus with said bias voltage said developer roller manipulates a toner on an outer surface of said developer roller whereby said toner is a powder;

and thus said developer roller is capable of supplying said toner to said photoreceptor;

and thus with said bias voltage said developer roller manipulates said toner supplied to said photoreceptor;

so as to supply the correct amount of said toner to said photoreceptor;

and so that said developer roller will receive back some of the unused said toner that said photoreceptor does not use;

whereby said toner transported from said developer roller to said photoreceptor is manipulated with said bias voltage;

and also unused said toner transported from said photoreceptor and returned to said developer roller is also manipulated by said bias voltage.

11. An improved toner cartridge as in claim 10 whereby said electrobushing has a cylindrical portion.

12. An improved toner cartridge as in claim 11 whereby said electrobushing has a rim.

13. An improved toner cartridge as in claim 12 whereby said electrobushing has a flat ring shaped portion formed where said cylindrical portion joins said rim.

14. An improved electrical connection device as in claim 12 wherein said rim has a first flat surface that makes rotational electrical contact with a second flat surface on said bias voltage contact positioned in distance where said first portion and said second portion join but perpendicular to said first portion and at least the diameter of said first portion.

15. An improved toner cartridge as in claim 10 whereby said electrobushing is made of metal.

16. An improved toner cartridge as in claim 10 whereby said electrobushing is made of conductive plastic.

17. An improved image forming apparatus as in claim 10 wherein said second end of said electrobushing makes electrical contact with a contact ring located on said endcap.

18. An improved image forming apparatus comprising of a dry toner style printer, copy machine or facsimile machine;

whereby said improved image forming apparatus makes an image on media;

where media may be paper, overhead slide media, microfilm, plastic, labels, cardboard, disk labels, CDROM labels or any dry toner printable media used with a xerographic imaging device;

whereby said improved image forming apparatus contains a toner storage container, a waste toner hopper, a photoreceptor, a cleaning blade, a fuser section, a photoreceptor charging device and a transfer section;

whereby said toner storage container has a storage lank, an endcap and a developer roller;

whereby a bias voltage contact fits in one end of said developer roller;

whereby said bias voltage contact has a first portion that fits inside said developer roller and has electrical continuity with an inner wall of said developer roller;

whereby a second portion of said bias voltage contact has a portion that is cylindrical in shape;

and whereby said cylindrical portion of said second portion of said bias voltage contact is of a smaller diameter than said first portion and rotates in an electrobushing;

whereby said electrobushing has a bore to receive said cylindrical portion of said second portion of said bias voltage contact at a first end in such a way where said electrobushing acts as a rotational bearing of said cylindrical portion of said second portion of said bias voltage contact;

and said electrobushing also has electrical continuity with said bias voltage contact;

and a second end of said electrobushing makes electrical contact directly or indirectly with a power supply of said improved image forming apparatus;

and thus said power supply of said improved image forming apparatus supplies a bias voltage which electrically connects to said electrobushing which electrically connects to said bias voltage contact which electrically connects to said inner wall of said developer roller;

whereby said developer roller thereby receives said bias voltage:

and thus with said bias voltage said developer roller manipulates a toner on outer surface of said developer roller whereby said toner is a powder;

and thus said developer roller is capable of supplying said toner to said photoreceptor;

and thus with said bias voltage said developer roller manipulates said toner supplied to said photoreceptor;

so as to supply the correct amount of said toner to said photoreceptor;

and so that said developer roller will receive some of the unused said toner that said photoreceptor does not use;

whereby said toner transported from said developer roller to said photoreceptor is manipulated with said bias voltage;

and also said toner transported from said photoreceptor and returned to said developer roller is also manipulated by said bias voltage.

19. An improved image forming apparatus as in claim 18 whereby said electrobushing has a cylindrical portion.

20. An improved image forming apparatus as in claim 19 whereby said electrobushing has a rim.

21. An improved image forming apparatus as in claim 20 whereby said electrobushing has a flat ring shaped portion formed where said cylindrical portion joins said rim.

22. An improved electrical connection device as in claim 20 wherein said rim has a first flat surface that makes rotational electrical contact with a second flat surface on said bias voltage contact positioned in distance where said first portion and said second portion join but perpendicular to said first portion and at least the diameter of said first portion.

23. An improved image forming apparatus as in claim 18 whereby said electrobushing is made of metal.

24. An improved image forming apparatus as in claim 18 whereby said electrobushing is made of conductive plastic.

25. An improved image forming apparatus as in claim 18 wherein said second end of said electrobushing makes electrical contact with a contact ring located on said endcap.

26. A method of making an improved image forming apparatus comprising of a dry toner style printer, copy machine or facsimile machine;

whereby the improved image forming apparatus makes an image on media;

where media may be paper, overhead slide media, microfilm, plastic, labels, cardboard, disk labels, CDROM labels or any dry toner printable media used with a xerographic imaging device;

whereby said method involves manufacturing an improved image forming apparatus which has a toner storage container, a waste loner hopper, a photoreceptor, a cleaning blade, a fuser section, a photoreceptor charging device and a transfer section;

whereby the toner storage container has a storage tank, an endcap and a developer roller;

whereby said method involves a step of placing a bias voltage contact in one end of the developer roller;

whereby the bias voltage contact has a first portion that fits inside the developer roller and makes electrical contact with an inner wall of the developer roller;

whereby a second portion of the bias voltage contact has a portion that is cylindrical in shape is of a smaller diameter than the first portion;

and whereby said method involves a step of positioning the cylindrical portion of the second portion of the bias voltage contact in an electrobushing where the bias voltage contact can rotate;

whereby the electrobushing has a bore to receive the cylindrical portion of the second portion of the bias voltage contact at a first end in such a way that electrobushing acts as a rotational bearing of the cylindrical portion of the second portion of the bias voltage contact;

and the electrobushing also makes electrical contact with the bias voltage contact;

and a second end the electrobushing makes electrical contact directly or indirectly with a power supply of the improved image forming apparatus;

and thus the power supply of the improved image forming apparatus supplies a bias voltage which electrically connects to the electrobushing which electrically connects to the bias voltage contact which electrically connects to the inner wall of the developer roller;

whereby the developer roller thereby receives the bias voltage;

and thus with the bias voltage the developer roller manipulates a powdered toner on an outer surface of the developer roller;

and thus the developer roller is capable of supplying the toner to the photoreceptor;

and thus with the bias voltage the developer roller manipulates the toner supplied to the photoreceptor;

so as to supply the correct amount of the toner to the photoreceptor;

and so that the developer roller will take back some of the unused the toner that the photoreceptor does not use;

whereby the toner transported from the developer roller to the photoreceptor is manipulated with the bias voltage;

and also the toner transported from the photoreceptor and returned to the developer roller is also manipulated by the bias voltage.

27. A method as in claim 26 whereby the electrobushing bas a cylindrical portion.

28. A method as in claim 26 whereby the electrobushing has a rim.

29. A method as in claim 28 whereby the electrobushing has a flat ring shaped portion formed where the cylindrical portion joins the rim.

30. A method as in claim 28 wherein the rim of the electrobushing has a first flat surface that makes rotational electrical contact with a second flat surface on the bias voltage contact positioned in distance where the first portion and the second portion join but perpendicular to the cental axis of the first portion and at least the diameter of the first portion, a step involving positioning the rim of the electrobushing to make electrical contact with the second flat surface of the bias voltage contact.

31. A method as in claim 26 wherein a step in the process is included where the second end of the electrobushing makes electrical contact with a contact ring located on the endcap; and whereby a step involves positioning the electrobushing so that it electrically contacts the contact ring.

32. An improved electrical connection device for use in an image forming apparatus comprising of a printer, copy machine or a facsimile machine or a toner cartridge used therein to supply a bias voltage to a developer roller whereby a bias voltage contact fits into the developer roller; and
   whereby said bias voltage contact has a first portion that fits into the developer roller; and
   whereby said bias voltage contact has a second portion which is cylindrical; and
   wherein the developer roller has a counterbore and therefore has a larger diameter bore region and a smaller diameter bore region; and
   said first portion of said bias voltage contact has a larger diameter portion and a smaller diameter portion; and
   said larger diameter portion of said first portion of said bias voltage contact fits into the larger diameter bore region while said smaller diameter portion of said first portion of said bias voltage contact fits into the smaller diameter bore region.

33. An improved electrical connection device as in claim 32 wherein said first portion of said bias voltage contact press-fits into the developer roller.

34. An improved electrical connection device as in claim 32 wherein a spring makes electrical contact between said second portion of said bias voltage contact and a power supply of the image forming apparatus.

35. An improved electrical connection device as in claim 32 wherein a spring makes electrical contact between said second portion of said bias voltage contact and a contact ring in an endcap of the toner cartridge.

36. An improved toner cartridge used in an image forming apparatus comprising of a dry toner style printer, copy machine or facsimile machine;
   whereby said toner cartridge comprises of a toner hopper and a waste toner hopper; and
   whereby said waste loner hopper comprises of a photoreceptor, a cleaning blade, a charging device for electrostatically charging said photoreceptor and a container to receive waste toner; and
   whereby said toner hopper comprises of a storage tank, an endcap and a developer roller; and
   whereby a bias voltage contact fits into said developer roller; and
   whereby a first portion of said bias voltage contact has a region that is cylindrical in shape that fits inside said developer roller and has electrical continuity with an inner wall of said developer roller; and
   wherein said developer roller has a counterbore and therefore has a larger diameter bore region and a smaller diameter bore region; and
   said first portion of said bias voltage contact has a larger diameter portion and a smaller diameter portion; and
   said larger diameter portion of said first portion of said bias voltage contact fits into said larger diameter bore region while said smaller diameter portion of said first portion of said bias voltage contact fits into said smaller diameter bore region for a better fit and better electrical connection with inner wall of said developer roller; and
   wherein said bias voltage contact has a second portion.

37. An improved toner cartridge as in claim 36 wherein said first portion of said bias voltage contact press-fits into said developer roller.

38. An improved toner cartridge as in claim 36 wherein a spring makes electrical contact between said second portion of said bias voltage contact and a power supply of the image forming apparatus.

39. An improved toner cartridge as in claim 36 wherein a spring makes electrical contact between said second portion of said bias voltage contact and a contact ring in said endcap of said toner cartridge.

40. An improved image forming apparatus comprising of a dry toner style printer, copy machine or facsimile machine;
   whereby said improved image forming apparatus makes an image on media;
   where media may be paper, overhead slide media, microfilm, plastic, labels, cardboard, disk labels, CDROM labels or any dry toner printable media used with a xerographic imaging device;
   whereby said improved image forming apparatus contains a toner storage container, a waste toner hopper, a photoreceptor, a cleaning blade, a fuser section, a photoreceptor charging device and a transfer section;
   whereby said toner storage container has a storage tank, an endcap and a developer roller;
   whereby a bias voltage contact fits in one end of said developer roller;
   whereby said bias voltage contact bas a first portion that fits inside said developer roller and has electrical continuity with an inner wall of said developer roller;
   whereby a second portion of said bias voltage contact has a portion that is cylindrical in shape and is of a smaller diameter than said first portion; and
   wherein said developer roller has a counterbore and therefore has a larger diameter bore region and a smaller diameter bore region; and
   said first portion of said bias voltage contact has a larger diameter portion and a smaller diameter portion; and
   said larger diameter portion of said first portion of said bias voltage contact fits into said larger diameter bore region while said smaller diameter portion of said first portion of said bias voltage contact fits into said smaller diameter bore region for a better fit and better electrical connection.

41. An improved image forming apparatus as in claim 40 wherein said first portion of said bias voltage contact press-fits into said developer roller.

42. An improved image forming apparatus as in claim 40 wherein a spring makes electrical contact between said second portion of said bias voltage contact and a power supply of said improved image forming apparatus.

43. An improved image forming apparatus as in claim 40 wherein a spring makes electrical contact between said second portion of said bias voltage contact and a contact ring in said endcap.

44. A method of making an improved image forming apparatus comprising of a dry toner style printer, copy machine or facsimile machine; and
   whereby the improved image forming apparatus makes an image on media; and
   whereby media may be paper, overhead slide media, microfilm, plastic, labels, cardboard, disk labels, CDROM labels or any dry toner printable media used with a xerographic imaging device; and
   whereby said method involves manufacturing an improved image forming apparatus which has a toner storage container, a waste toner hopper, a photoreceptor, a cleaning blade, a fuser section, a photoreceptor charging device and a transfer section;
   whereby the toner storage container has a storage tank, an endcap and a developer roller;

whereby the developer roller has a developer roller sleeve; and whereby said method involves a step of placing a bias voltage contact in one end of the developer roller sleeve;

whereby the bias voltage contact has a first portion that fits inside the developer roller sleeve and has electrical continuity with an inner wall of the developer roller sleeve;

whereby a second portion of the bias voltage contact has a portion that is cylindrical in shape and is of a smaller diameter than the first portion; and whereby said method involves another step of making a counterbore in the developer roller sleeve whereby the developer roller sleeve has a larger diameter bore region and a smaller diameter bore region; and a first portion of the bias voltage contact has a larger diameter portion and a smaller diameter portion; and the larger diameter portion of the first portion of the bias voltage contact fits into the larger diameter bore region while the smaller diameter portion of the first portion of the bias voltage contact fits into the smaller diameter bore region for a better fit and better electrical connection.

45. A method as in claim 44 wherein said method involves a step wherein the first portion of the bias voltage contact press-fits into the developer roller.

46. A method as in claim 44 wherein said method involves a step wherein a spring electrically connects the second portion of a bias voltage contact to the power supply of the improved image forming apparatus.

47. A method as in claim 44 wherein said method involves a step wherein a spring electrically connects the second portion of the bias voltage contact to a contact ring in the end cap of a toner cartridge.

* * * * *